United States Patent

Yoda et al.

[11] Patent Number: 6,056,996
[45] Date of Patent: May 2, 2000

[54] MAGNETORESISTANCE EFFECT TYPE HEAD AND SEPARATE RECORDING-REPRODUCING TYPE MAGNETIC HEAD

[75] Inventors: Hiroaki Yoda, Kawasaki; Atsuhito Sawabe; Hitoshi Iwasaki, both of Yokosuka; Naoyuki Inoue, Yokohama; Akio Hori, Kawasaki, all of Japan

[73] Assignee: Kabushiki Kaisha Toshiba, Kawasaki, Japan

[21] Appl. No.: 09/358,465

[22] Filed: Jul. 22, 1999

Related U.S. Application Data

[62] Division of application No. 08/780,328, Jan. 8, 1997, which is a division of application No. 08/314,508, Sep. 28, 1994, Pat. No. 5,633,771.

[30] Foreign Application Priority Data

Sep. 29, 1993 [JP] Japan ..................................... 5-242570
Mar. 15, 1994 [JP] Japan ..................................... 6-044426

[51] Int. Cl.$^7$ ...................................................... B05D 5/12
[52] U.S. Cl. ........................ 427/130; 427/131; 427/132; 427/264; 427/265; 427/331; 427/404
[58] Field of Search ..................... 427/130, 131, 427/132, 264, 265, 331, 404

[56] References Cited

U.S. PATENT DOCUMENTS

| | | |
|---|---|---|
| 4,663,685 | 5/1987 | Tsang . |
| 5,285,340 | 2/1994 | Ju et al. . |
| 5,315,469 | 5/1994 | McNeil . |
| 5,422,571 | 6/1995 | Gurney et al. . |

FOREIGN PATENT DOCUMENTS

| | | |
|---|---|---|
| 55-4727 | 1/1980 | Japan . |
| 61-248212 | 11/1986 | Japan . |
| 2-208812 | 8/1990 | Japan . |
| 3-205607 | 9/1991 | Japan . |
| 3-296907 | 12/1991 | Japan . |

*Primary Examiner*—Bernard Pianalto
*Attorney, Agent, or Firm*—Finnegan, Henderson, Farabow, Garrett & Dunner, L.L.P.

[57] ABSTRACT

A magnetoresistance effect type head comprises a magnetoresistance effect film having a pair of leads connected thereto and possessing a magnetic field responding part and a pair of upper and lower shield layers having a magnetoresistance effect film nipped therebetween through the medium of a magnetic gap-forming insulating film. This magnetoresistance effect type head satisfies the relations, $W_s < W_r$ and $T_r < W_r$, wherein $W_s$ stands for the width of the surface of the upper shield layer facing the magnetoresistance effect film, $W_r$ for the distance between the pair of leads, and $T_r$ for the width of the magnetic field responding part of the magnetoresistance effect film. The magnetic field responding part of the magnetoresistance effect film is formed as of the remainder of the MR film region whose magnetic moment is fixed outside the end part of the upper shield layer facing the MA film. The magnetic field responding part is otherwise formed of a protruding part of the magnetoresistance effect film extended in the direction of the surface facing the medium. As a result, linear resolution suitable for a system having such high recording density as exceeds the order of Gb/inch$^2$ of planar recording density is obtained. Further, a narrow track suitable for a system of high recording density can be produced accurately.

4 Claims, 25 Drawing Sheets

MAGNETORESISTANCE EFFECT TYPE HEAD AND SEPARATE RECORDING-REPRODUCING TYPE MAGNETIC HEAD

This is a division of application Ser. No. 08/780,328, filed Jan. 8, 1997, which is a division of application Ser. No. 08/314,508, filed Sep. 28, 1994, U.S. Pat. No. 5,633,771. The contents of these applications being relied upon and incorporated by reference herein.

BACKGROUND OF THE INVENTION

1. Field of the Invention

This invention relates to a magnetoresistance effect type head to be used as a reproducing head for a magnetic recording and a separate recording-reproducing type magnetic head using the magnetoresistance effect head.

2. Description of the Related Art

In recent years, high densification of magnetic recording has advanced to the extent of realizing systems of such high levels of recording density as 500 Mb/inch$^2$ in VTR and 200 Mb/inch$^2$ in HDD for practical use. The demand for further densification of magnetic recording is steadily increasing in enthusiasm. This trend of the magnetic recording toward higher densification entails the essential task of reducing track width. In the case of a 200 Mb/inch$^2$ HDD system, for example, a track width is 7 μm and the track-to-track separation is about 2 μm and, therefore, the tolerance of the track width is roughly the distance (2 μm) between the adjacent loops of the track. For the sake of attaining further exaltation of the recording density, it is necessary that the track width should be reduced to below 5 to 6 μm and the tolerance should not be more than 0.5 μm. In order to exalt the density of recording to the level of about 10 Gbits/inch$^2$, it is expected that the track width would be required to be not more than 1 μm and the tolerance thereof to be roughly 0.1 μm. For the purpose of fulfilling these requirements, the magnetic head requires a marked improvement.

A method for defining such a narrow track-width of heads has been reported, by which magnetic core in air bearing surface is focused ion etched (refer to Japanese Patent Laid-Open Application No. 3-296907). This method, however, is handicapped greatly in the capacity for mass production because the method requires processing of the magnetic heads one by one and the FIB etching technique itself has a very poor throughput, though the method is capable of infallibly producing an accurate track width.

A thin-film magnetic head has been reported (Japanese Patent Laid-Open Application No. 3-205607) which has a magnetic core on the air bearing surface the width of which increases in proportion to the distance from the magnetic gap. This method, however, is incapable of acquiring ample forming accuracy because it requires to impart diverging cross sections to the magnetic cores. It is further disadvantageous that it incurs difficulty during the impartation of an axis of easy magnetization in the direction of track width to the narrowed track and fails to confer ample high-frequency permeability on the track.

As respects the reproducing head for a system of such a high recording density as mentioned above, the magnetoresistance effect type head (hereinafter referred to as "MR head") which utilizes magnetoresistance effect, the phenomenon that the electric resistance of a certain type of magnetic thin film or magnetic multilayer thin film is varied by an external magnetic field, has come to attract attention. Since the MR head is capable of producing a high output even in a system having a low relative speed between a head and a medium, it has been heretofore used mainly in stationary head type tape medium reproducing systems. Since the MR head possesses a high S/N, however, it has come to be adopted recently even for the small HDD which has such a low relative speed as several meters/second in the place of the induction type reproducing head.

FIG. 27 shows one example of the construction of the conventional shield type MR head. A pair of leads 2 are connected severally to the opposite ends of a magnetoresistance effect film 1 made of an anisotropic magnetoresistance effect film, a spin valve film, or a artificial lattice film. They jointly form a magnetoresistance effect element (hereinafter referred to as "MR element") 3. This MR element 3 is placed between insulating films 4 and 5 which form a reproducing magnetic gap. On the outer sides of the insulating films 4 and 5, a pair of upper and lower shield layers 6 and 7 capable of defining linear resolution are respectively disposed. The upper shield layer 7 concurrently serves normally as a lower magnetic core of the magnetic head. On the upper shield layer 7, an upper magnetic core 9 is formed through the medium of an insulating film 8 which forms a recording magnetic gap. These components jointly form a recording magnetic path.

When the shield type MR head constructed as described above is used as a reproducing head, the linear resolution thereof is substantially determined by the length of the upper reproducing magnetic gap (the thickness of the insulating film 5) or the length of the lower reproducing magnetic gap (the thickness of the insulating film 4). In the construction of the conventional MR head, however, for the sake of securing insulation between the lead 2 and the upper shield layer 7, it has been necessary that the insulating film 5 should be formed in a thickness roughly equal to step height of the lead. As a result, it has been extremely difficult to define the high linear resolution to a level of not more than the thickness of the lead 2. In fact, the thickness of the lead 2 is desired to be not less than 0.2 μm for the purpose of enabling the MR element to keep its ratio of change of resistance. Thus, the improvement of the linear resolution to be attained in the shield type MR head has had its own limit.

In the system of such high recording density as a recording density exceeding the order of Gb/inch$^2$, for example, since the necessary linear resolution is equal to or smaller than the thickness of the lead of the shield type MR head, the shield type MR head of the conventional construction described above is incapable of attaining this high linear resolution. Under the circumstances, the desirability of realizing a shield type MR head possessing such a high linear resolution as is suitable for a system of high recording density exceeding the order of Gb/inch$^2$ has been finding growing recognition.

Further, in the case of a recording density of 1 Gb/inch$^2$, for example, the width of the shield layers 6 and 7 is desirably set at a level in the approximate range of from 3 to 5 μm because the track width is about 3 μm. Since the shield layers 6 and 7 have a thickness of about 2 μm, the MR element 3 must be formed on a protruding part measuring approximately 2 μm in height and 3 μm in width. In the case of a greater recording density of 10 Gb/inch$^2$, it is more sternly necessary that the MR element 3 should be formed on a protruding part approximately measuring 2 μm in height and 1 μm in width. An attempt to restrain the size as of the track width of the MR element of a micron order on a substrate having such a protrusion as mentioned above merely results in seriously degrading the yield of production. If a resist 3 μm in thickness is formed on a substrate having a protruding part roughly 2 μm in height and 2 μm in width and a stripe (remnant) pattern 1 μm in width is formed on the resist, for example, the difference of the width of the MR pattern between on a mask and on a wafer will inevitably amount to −0.3 μm. Thus, the conventional shield type MR head entails the problem of imparting an abrupt jog to the substrate of the MR element and rendering accurate regulation of the track width of the MR element no longer practicable when an attempt is made to improve the recording density as described above.

When the recording head is formed on the shield type MR head which is constructed as described above, the magnetic gap of the recording head is such that the linearity thereof depends on the thickness of the lead 2 of the MR element 3 as clearly remarked from FIG. 27. The lead 2 in this case is generally formed by the lift-off method which inflicts only slight damage to the MR element 3. The read 2 which is formed by this lift-off method forms projections in the edge parts at a certain degree of probability even when a reversely tapered resist is used. As a result, the yield of production is degraded by the phenomenon of shortening between the leads and the shield when the projections go to narrow the gap between the shield and the lead. Indeed, the degradation of the yield by the shortening can be prevented to a certain extent by decreasing the thickness of the lead 2. The lead 2, however, does not tolerate a generous decrease of thickness because the decrease of thickness of the lead 2 results in an increase of resistance and a substantial decrease of the ratio of change of resistance.

Specifically, regarding the layout of the lead 2, the practice of disposing the lead 2 in such a manner that the area in which the shield 7 and the lead 2 overlap each other may be decreased to the fullest possible extent as shown in FIG. 28 is followed for the purpose of precluding the shortening between the shield and the lead. FIG. 29 shows the relation between the ratio of change of resistance of the MR element and the variation of the thickness of the lead 2 as determined with respect to varied track widths ($T_w$) in the construction having the lead 2 disposed as described above. It is clearly noted from FIG. 29 that the dispersion of the specific resistance of the lead 2 increases and, as a result, the ratio of change of resistance abruptly decreases when the thickness of the lead 2 decreases below about 0.4 μm. In order to keep the ratio of change of resistance from decreasing extremely, therefore, it is necessary that the thickness of the lead should be not less than about 0.4 μm, and not less than about 0.2 μm at least.

In the shield type MR head of the conventional construction, the linearity of the recording magnetic gap depends on the thickness of the lead as described above. If the thickness of the lead does not decrease in proportion as the length of the recording magnetic gap decreases as expected in the future, therefore, the linearity of the recording magnetic gap will be degraded more seriously by the difference of level due to the thickness of the lead. With such a track width as the maximum of 5 μm, therefore, the off-track characteristic will be degraded to a great extent. As a result, a heavy azimuth loss is suffered to occur when the MR element is operated for reproduction. In actuality, the degradation of the linearity of the recording magnetic gap which occurs as described above poses a problem when the recording magnetic gap is formed in a size roughly not more than 10 times the thickness of the lead.

SUMMARY OF THE INVENTION

An object of this invention, therefore, is to provide a shield type magnetoresistance effect type head which is capable of acquiring a linear resolution suitable for a system of high recording density having a planar recording density exceeding the order of Gb/inch$^2$, for example. A further object of this invention is to provide a shield type magnetoresistance effect type head which is capable of permitting accurate regulation of sizes such as the track width and, at the same time, acquiring a large ratio of change of resistance and, therefore, is suitable for a system of high recording density.

Another object of this invention is to provide a separate recording-reproducing type magnetic head which is adapted for such a system of high recording density as mentioned above and, at the same time, adapted to manifest exalted recording-reproducing characteristics. Yet another object of this invention is to provide a separate recording-reproducing type magnetic head which is prevented from entailing degradation of the off-track characteristic thereof in consequence of an increase of the recording density.

The first magnetoresistance effect type head of this invention is characterized by comprising a magnetoresistance effect film having a pair of leads connected thereto and possessing a magnetic field responding part, a lower shield layer disposed on the lower side of the magnetoresistance effect film through the medium of a magnetic gap forming insulating film, and an upper shield layer disposed on the upper side of the magnetoresistance effect film through the medium of another magnetic gap forming insulating film, which magnetoresistance effect type head satisfies the relations, $W_s < W_r$ and $T_r < W_r$, wherein $W_s$ stands for the width of the surface of the upper shield layer facing the magnetoresistance effect film, $W_r$ for the distance between the pair of leads, and $T_r$ for the width of the magnetic field responding part of the magnetoresistance effect film.

The active region, which responds to a magnetic field, is formed of the remainder of the MR film region whose magnetic moment is fixed. Alternatively, the active part is formed of the protruding part of the magnetoresistance effect film extended in the direction of the surface thereof facing the medium.

The second magnetoresistance effect type head of this invention is characterized by comprising a magnetoresistance effect film having a pair of leads connected thereto and a pair of shield layers having the magnetoresistance effect film interposed therebetween through the medium of a magnetic gap-forming insulating film, at least either of the pair of shield layers being formed as embedded at least partly within a trench formed in the insulating layer.

Further the first separate recording-reproducing type magnetic head of this invention is characterized by comprising a reproducing head formed of the first magnetoresistance effect type head mentioned above having an upper shield layer so shaped as to possess a protruding part extended in the direction of the magnetic gap-forming insulating film and a recording head formed of a induction type head possessing a pair of magnetic cores opposed to each other through the medium of a magnetic gap, the lower of the pair of magnetic cores being formed of a magnetic material layer shared with the upper shield layer of the magnetoresistance effect type head and, the surface of at least either of the pair of magnetic cores facing the medium possessing a protruding part extended in the direction of the magnetic gap.

The second separate recording-reproducing type magnetic head of this invention is characterized by comprising a reproducing head formed of a magnetoresistance effect type head possessing a magnetoresistance effect film having a pair of leads connected thereto and a pair of shield layers having the magnetoresistance effect film interposed therebetween through the medium of a magnetic gap forming insulating film and a recording head formed of an induction magnetic head superposed on the magnetoresistance effect type head and possessing a pair of magnetic cores opposed to each other across a magnetic gap of a size of not more than 10 times the thickness of the lead of the magnetoresistance effect type head, the magnetic gap possessing substantial linearity throughout the entire width of the recording track.

In the first magnetoresistance effect type head, the leads are disposed outside the substantial opposite edges of the reproducing magnetic gap by causing the distance $W_r$ between the leads to be smaller than the width $W_s$ of the surface of the upper shield layer facing the magnetoresistance effect film. Owing to this arrangement, the effect of the thickness of the leads on the length of the reproducing magnetic gap can be eliminated. As a result, the desire to decrease the gap can be realized and the linear resolution suitable for the exaltation of recording density even exceeding the order of Gb/inch$^2$ can be attained.

Further, since the width $T_r$ of the active region of the magnetoresistance effect film is caused to be smaller than the distance $W_r$ between the leads and preferably smaller than the width $W_s$ of the surface of the upper shield layer facing the magnetoresistance effect film, the cross talk possibly induced by the decrease of the track width can be precluded and the exaltation of linear resolution can be attained by the decrease of the gap as well. In short, the decrease of the gap and the decrease of the track width can be obtained without inducing degradation of the regenerating characteristics.

The first separate recording-reproducing type magnetic head enables a system of high recording density to produce desired recording-and reproducing operations stably because it uses a reproducing head formed of the aforementioned first magnetoresistance effect type head and a recording head formed of an induction magnetic head. The induction magnetic head used herein allows the decrease of track width to be realized with high accuracy because the surface of the magnetic core facing the medium is so shaped as to possess a protruding part extended in the direction of the recording magnetic gap. Further, since the axis of easy magnetization of the protruding part of the magnetic core is easily aligned in the direction of the track width in this case, the axis of easy magnetization can be parallelled with the direction of the track width enough to obtain ample high-frequency permeability stably even when the track width is decreased.

In the second magnetoresistance effect type head, since at least one of the pair of shield layers is formed as embedded in a trench formed in the insulating layer, the upper surface of the shield layer is enabled to keep flatness and smoothness intact. Then the magetoresistance element or the upper magnetic core is formed on the shield layer having such a flat and smooth surface, therefore, the work for decreasing the track width can be carried out accurately and easily even when the width of the shield layer is small and, at the same time, the acquisition of ideal ratio of change of resistance can be ensured.

In the second separate recording-reproducing type magnetic head, linearity is substantially imparted to the recording magnetic gap throughout the entire width of the recording track of the induction magnetic head serving as a recording head by causing the shield layer concurrently serving as a lower magnetic core and excelling in flatness and smoothness to be formed as embedded in the trench formed in the insulating layer and having the recording magnetic gap formed on the shield layer. As a result, the off-track characteristic which is manifested during the reproduction by the magnetoresistance effect type head can be markedly improved.

DESCRIPTION OF THE PREFERRED EMBODIMENTS

Now, the embodiments of this invention will be described more specifically below.

Figure 1:
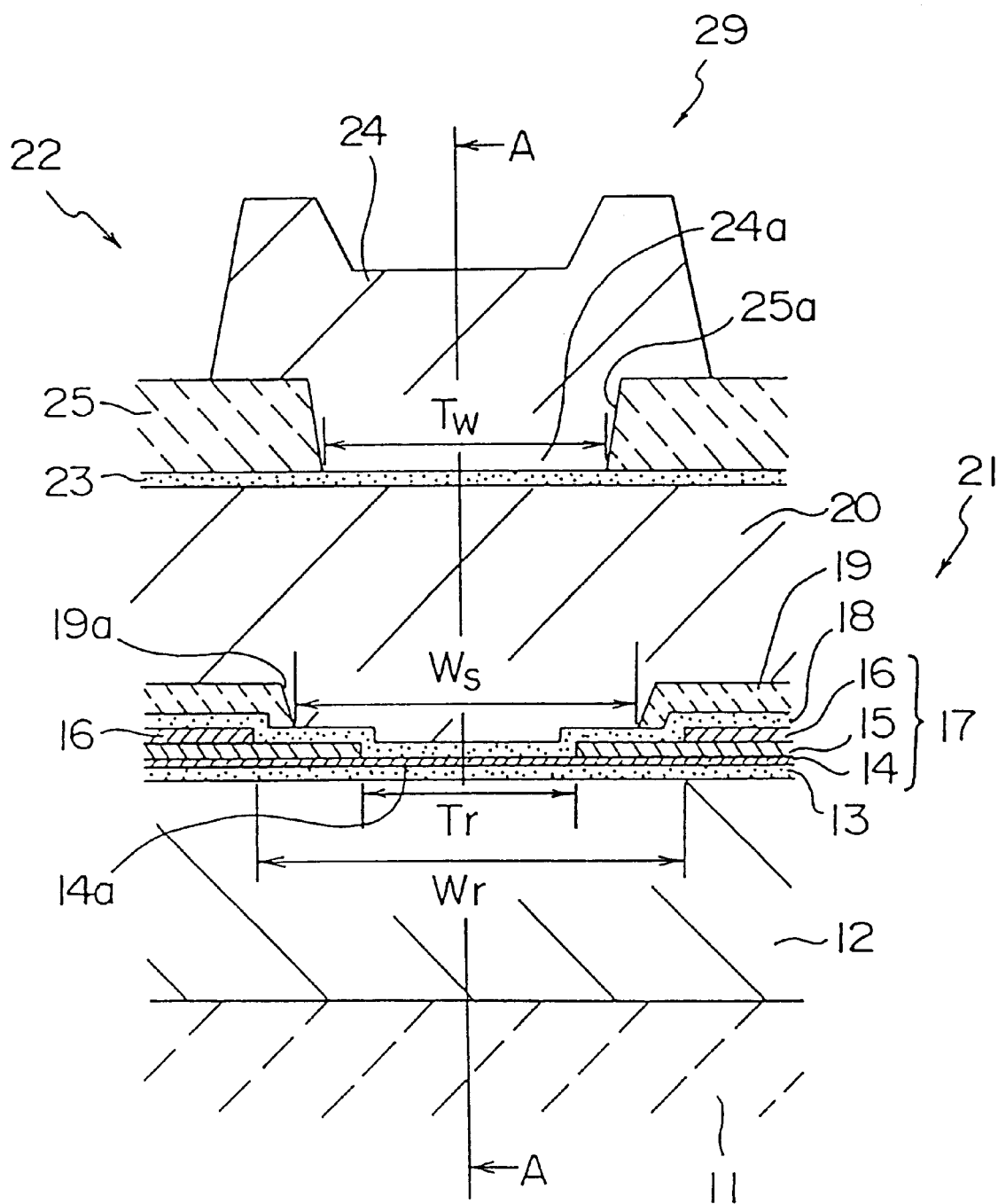
FIG. 1 is a cross section showing the construction of a separate recording-reproducing type magnetic head according to the first embodiment of this invention.
Figure 2:
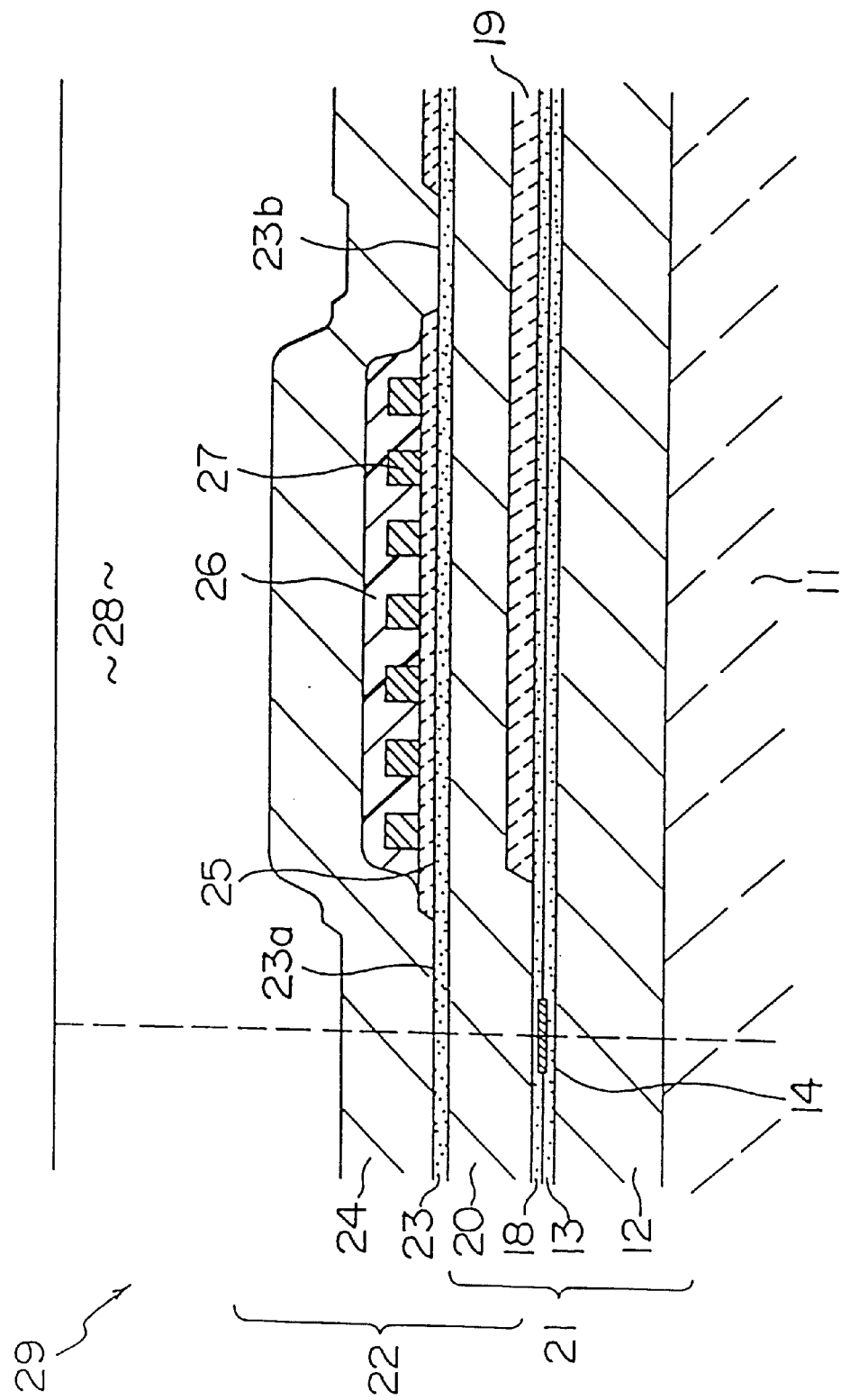
FIG. 2 is a diagram showing a cross section taken through the separate recording-reproducing type magnetic head shown in FIG. 1 across the line A—A.

FIG. 1 and FIG. 2 are diagrams showing the construction of a separate recording-reproducing type magnetic head according to one embodiment of this invention. FIG. 1 is a front view of the construction taken from the surface opposite a medium and FIG. 2 is a cross section taken through FIG. 1 along the line A—A. In these diagrams, 11 stands for a substrate which is made as of $Al_2O_3 \cdot TiC$ incorporating $Al_2O_3$. On this substrate 11 is formed a lower shield layer 12 which is made of such a soft magnetic material as NiFe alloy or an amorphous alloy like CoZrNb. On the lower shield layer 12, a magnetoresistance effect film (MR film) 14 is formed through the medium of a lower regenerating magnetic gap layer 13 made of an insulating film such as of $Al_2O_3$.

An anisotropic magnetoresistance effect film made as of $Ni_{80}Fe_{20}$ and allowed to offer such electric resistance as varies with the angle formed between the direction of electric current and the magnetizing moment of the magnetic material layer, a spin valve film made as of a $Co_{90}Fe_{10}/Cu/Co_{90}Fe_{10}$ laminate film having the laminate of a magnetic film and a non-magnetic film and showing the so-called spin valve effect of offering such electric resistance as varies with the angle formed between the directions of magnetization of the magnetic material layers, or a artificial lattice film manifesting gigantic magnetoresistance effect, for example, may be cited as a concrete example of the MR film 14 mentioned above.

On the MR film 14, a pair of magnetically fixed film 15 made of a hard magnetic film or an antiferromagnetic film as of FeMn are formed in a desired shape. An opening (remnant part) between the magnetically fixed films 15 forms a magnetic field responding part 14a. In other words, the width (active area width) $T_r$ of the magnetic field responding part 14a of the MR film 14 is defined by the magnetically fixed films 15. A pair of leads 16 made as of Cu and electrically connected each to the opposite ends of the MR film 14 are formed on the magnetically fixed films 15. The MR film 14, the magnetically fixed films 15, and the leads 16 jointly form a MR element 17.

On the MR element 17 is formed an upper regenerating magnetic gap layer 18 which is made of an insulating film as of $Al_2O_3$. Insulating layers 19 made as of $SiO_2$ are formed further thereon. The insulating layers 19 are intended to secure dielectric strength between the leads 16 and an upper shield layer 20 and is formed so as to cover the upper surfaces of the leads 16. The upper shield layer 20 made of the same soft magnetic material as the lower shield layer 12 are formed as partly embedded in a trench 19a formed between the insulating layers 19 so that the surface thereof, opposite the medium, may assume a protruding shape extended in the direction of the upper regenerating magnetic gap layer 18. These components jointly form a shield type MR head 21 which functions as a regenerating head.

The width $W_s$ of the surface of the upper shield layer 20, opposite the MR film, is defined by the width of the trench 19a formed between the insulating layers 19. The trench 19a has the shape thereof so set that the width $W_s$ of the surface thereof, opposite the MR film, may be smaller than the distance $W_r$ between the pair of leads 16. Thus, the pair of leads 16 are disposed each outside the edges of the end parts of the surface of the upper shield layer 20 opposite the MR film. The magnetization of the MR film 14 positioned at least outside the edges of the end parts of the surface of the upper shield layer 20 opposite the MR film is attained by means of the magnetically fixed film 15 mentioned above. Actually, the pair of the magnetically fixed films 15 are so patterned that the width of the magnetic field responding part 14a of the MR film 14 (substantially the regenerating track width) $T_r$ corresponding to the distance between the pair of the magnetically fixed films 15 may be smaller than the distance $W_r$ between the leads 16 and the width $W_s$ of the surface of the upper shield layer 20 opposite the MR film.

In the shield type MR head 21 constructed as described above, the width $W_s$ of the surface of the upper shield layer 20 opposite the MR film is smaller than the distance $W_r$ between the leads 16 and the pair of leads 16 are disposed each outside the edges of the end parts of the surface thereof opposite the MR film. Owing to this arrangement, the thicknesses of the insulating layers 19 and the leads 16 permit elimination of the effect possibly exerted by the surface of upper shield layer 20 opposite the MR film on the substrate even when the insulating layers 19 for securing dielectric strength between the leads 16 and the upper shield layer 20 are formed. As a result, the substrate underlying the surface of the upper shield layer 20 opposite the MR film may be flattened to a great extent. The surface of the upper shield layer 20 opposite the MR film is not always required to be perfectly flat but may be caused to jog more or less owing to the difference of level formed in the upper surface of the MR element 17 excepting the leads 16 as shown in the diagram.

Specifically, in the present embodiment, the difference of level in the substrate underlying the surface of the upper shield layer 20 opposite the MR film may be made to equal the total (up to 0.08 μm, for example) of the thickness of the MR film 14 (up to 0.05 μm, for example) and that of the magnetically fixed film 15 (up to 0.03 μm, for example) and approximate about one half of the total (up to 0.15 μm, for example) of the thickness of the conventional MR film (up to 0.05 μm, for example) and that of the leads (up to 0.1 μm, for example). The formation of the insulating layer 19 enables the MR film 14 and the upper shield layer 20 to be insulated from each other by a thin insulating film, specifically the thin upper regenerating magnetic cap layer 18, in the magnetic field responding part 14*a* of the MR film 14 in addition to securing dielectric strength between the leads 16 and the upper shield layer 20. This fact indicates that the decrease of the gap to below 0.1 μm, for example, is attainable.

Further, since the MR film 14 positioned at least outside the edges of the opposite end parts of the surface of the upper shield layer 20 opposite the MR film, is fixed magnetically in place by the magnetically fixed layer 15, the otherwise possible occurrence of such adverse phenomena as cross talk can be precluded even when the width $W_s$ of the surface of the upper shield layer 20 opposite the MR film, is caused to be smaller than the distance $W_r$ between the leads 16 and the width $W_s$ of the upper shield layer 20 extends throughout the entire thickness thereof. As a result, the decrease of the track width can be realized without entailing such faults as degradation of the regeneration characteristics.

On the regenerating head which is formed of the shield type MR head 21 constructed as described above, the recording head formed of an induction type thin-film magnetic head 22 is formed. The upper shield layer 20 of the shield type MR head 21 serves concurrently as a lower magnetic core of the induction type thin-film magnetic head 22. On the lower magnetic core 20 furnished with a flat smooth upper surface, an upper magnetic core 24 is formed through the medium of a recording magnetic gap layer 23 which is made as of $Al_2O_3$. Here, the upper magnetic core 24 is formed as partly embedded in a trench 25*a* which is formed in a trench-forming insulating layer 25 superposed on the recording magnetic gap layer 23 and made as of $SiO_2$. The surface opposite the medium, namely the cross section of the leading end part of the upper magnetic core 24, is so shaped as to protrude in the direction of the recording magnetic gas layer 23.

A protruding part 24*a* of the upper magnetic core 24 defines the length of a front part gap 23*a* as shown in FIG. 2. A coil 27 made as of Cu and embedded in an insulating layer 26 as of photoresist is disposed between the lower magnetic core 20 and the upper magnetic core 24 behind the front part gap 23*a* mentioned above. A rear part gap 23*b* is formed further behind the coil 27. The rear part gap 23*b*, similarly to the front part gap 23*a*, has the length thereof defined by the upper magnetic core 24 being partly embedded in the trench formed in the trench-forming insulating layer 25.

Then, a protecting film 28 is formed on the upper magnetic core 24 to complete the induction type thin-film magnetic head 22. A separate recording-reproducing type magnetic head 29 is composed of the recording head which is formed of this induction type thin-film magnetic head 22 and the regenerating head which is formed of the shield type MR head 21 mentioned above.

Figure 3:
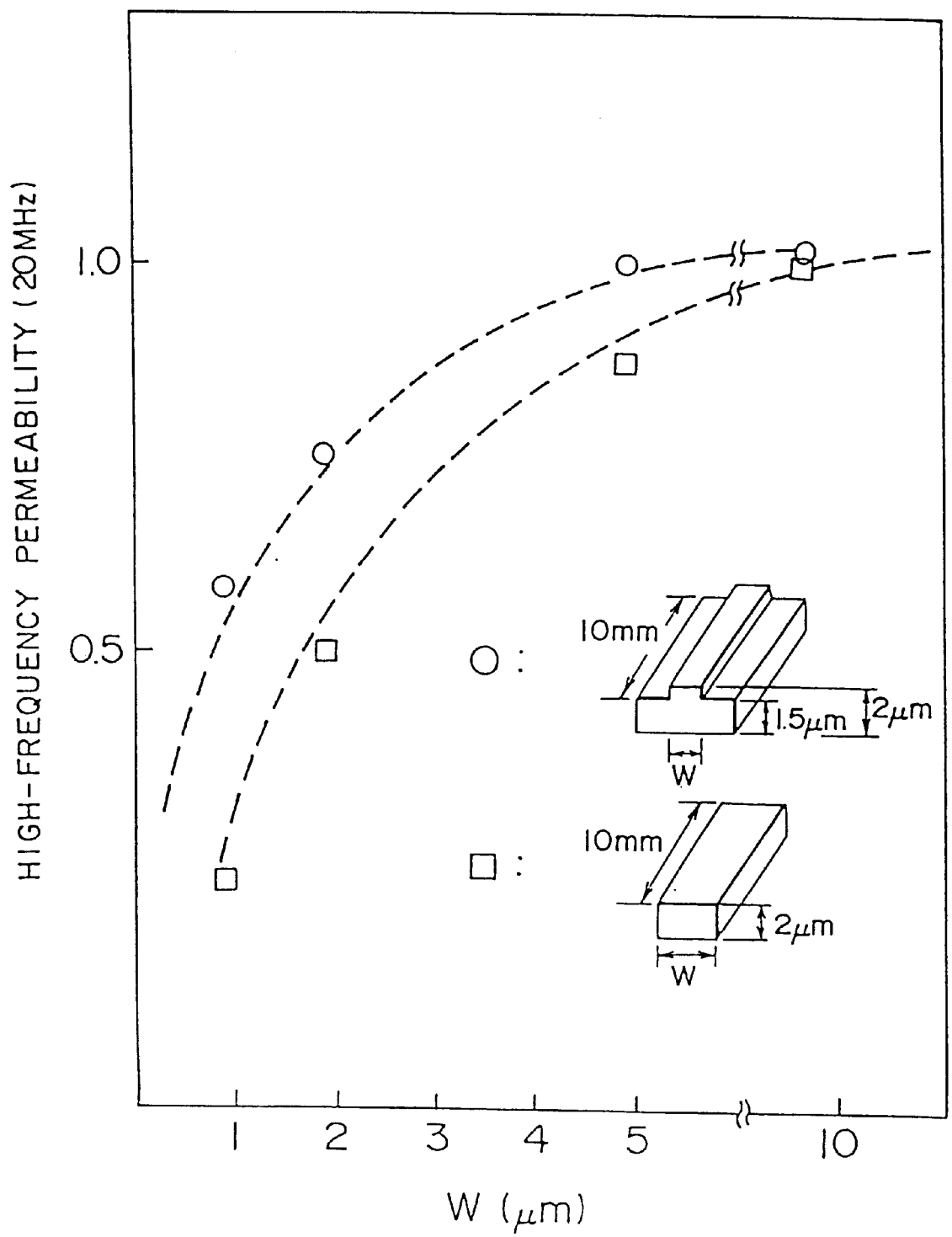
FIG. 3 is a diagram showing the relation between the shape of a magnetic material layer and the high-frequency permeability.

In the induction type thin-film magnetic head 22 constructed as described above, since the surface of the upper magnetic core 24 opposite the medium is protruded in the direction of the recording magnetic gap layer 23, the axis of easy magnetization of the protruding part 24*a* can be easily turned in the direction of the track width. The high-frequency permeability can be improved by turning in the direction of the track width the anisotropy of induced magnetism of the leading end part of the upper magnetic core 24. FIG. 3 shows the relation between the width of the protruding part of the magnetic material layer with a protruding shape and the width of the magnetic material layer with a rectangular shape (both of a width of W) and the high-frequency permeability. The data of high-frequency permeability given in the table represent the magnitudes determined by using the μ Kerr effect at 20 MHz. It is clearly noted from FIG. 3 that the effect of improving the high-frequency permeability of the protruding shape grows in proportion as the width of the magnetic layer decreases.

Then, in the induction type thin-film magnetic head 22 which is constructed as described above, the upper shield layer 20 concurrently serving as the lower magnetic core as described above has the surface thereof opposite the medium vested with a protruding shape extended in the direction of the upper regenerating magnetic gap layer 18. It is, therefore, extremely easy to give to the protruding part 24*a* of the upper magnetic core 24 a width smaller than the width of the surface of the upper shield layer 20 opposite the recording magnetic gap layer 23. As a consequently, the recording track width $T_w$ can be accurately defined with the width of the protruding part 24*a* of the upper magnetic core 24.

Incidentally, the induction type thin-film magnetic head 22 constructed as described above and the induction type thin-film magnetic head of the conventional construction were used each to produce a given recording on equal magnetic recording media and the recording media were examined to determine the recording efficiency of the magnetic heads. It was consequently found that the induction type thin-film magnetic head 22 of the embodiment under consideration manifested about 1.5 times as high recording efficiency at 50 MHz as the conventional magnetic head. In this test, the magnetic cores were invariably made of CoZrNb, the track width was set at 1 μm, the gap length at 0.2 μm, and the amount of floatation at 0.05 μm.

Then, in the induction type thin-film magnetic head 22 of the construction described above, the width $T_w$ of the recording track which is defined by the width of the protruding part 24*a* of the upper magnetic core 24 is caused to be larger than the regenerating track width of the shield type MR head 21, namely the width $T_r$ of the magnetic field responding part of the MR film 14, and smaller than the width $W_s$ of the surface of the upper shield layer 20 of the shield type MR head 21 opposite the MR film. In the separate recording-reproducing type magnetic head of this invention, the dimensions $T_r$, $T_w$, and $W_s$ are desirably required to satisfy this relation, $T_r < T_w < W_s$. By satisfying this requirement, the off-track characteristic of ideal grade can be stably obtained during the regeneration of a recording of high density.

Now, the process for the production of the separate recording-reproducing type magnetic head of the construction described above will be explained below with reference to FIG. 4 and FIG. 5.

First, the lower shield layer 12 of a thickness of about 1.5 μm and the lower magnetic gap layer 13 of a thickness of about 0.2 μm are formed as by the sputtering technique on the substrate 11. Further, the MR film 14 is formed by the vacuum deposition technique and the MR film 14 is patterned roughly in the shape of a ribbon as by the ion milling technique. Then, a pair of magnetically fixing films 15 and a pair of leads 16 are sequentially formed in the order mentioned in desired shapes as by the lift-off technique on the MR film 14 to complete the MR element 17 (a in FIG. 4). Further, the upper magnetic gap layer 18 of a width of about 0.2 μm and the insulating layer 19 of a width of about 0.5 μm made of $SiO_2$ are sequentially formed in the order mentioned as by the spattering technique (b in FIG. 4).

Then, a resist mask (not shown) is formed on the insulating layers 19. The insulating layers 19 are etched with such an etching gas as $CF_4$ to give rise to the trench 19a which is destined to serve as a part for forming the surface of the upper shield layer 20 opposite the MR film, as shown in c in FIG. 4. Here, the width of the trench 19a which determines the width $W_s$ of the surface of the upper shield layer 20, opposite the MR film, is caused to be smaller than the distance $W_r$ between the leads 16. With respect to the suitability of the process under consideration for quantity production, the depth of the trench 19a is desired to be in the approximate range of from 0.5 to 1.0 μm. The lateral walls of the trench 19a can be formed either slightly obliquely or perpendicularly by controlling the etching conditions.

Now, part of a magnetic material which is destined to form the upper shield layer 20 is embedded in the trench 19a as by the spattering technique and a magnetic material is subsequently superposed thereon to give rise to the upper shield layer 20 of a thickness of about 2 μm concurrently serving as a lower magnetic core (d in FIG. 4). In this case, the cavity in the trench 19a is desired to be filled out by the collimation spattering technique. Thereafter, the surface of the upper shield layer 20 is flattened by the operation of polishing back or etching back (e in FIG. 4). Incidentally, this step for flattening the surface of the upper shield layer 20 may be omitted as will be described specifically below.

Then, the recording magnetic gap layer 23 of a thickness of about 0.3 μm and the insulating layer 25 are sequentially formed in the order mentioned as by the spattering technique on the upper shield layer 20 which has acquired a flattened surface. Thereafter, the trenches (25a, etc.) are formed by the reactive ion etching technique in the parts of the insulating layer 25 corresponding to the front part gap and the rear part gap shown in FIG. 2. Further, a coil (not shown) is formed as by the plating technique on the insulating layer 25 and an insulating layer (not shown) is formed thereon excepting the front part gap and the rear part gap to bury the coil under the insulating layer consequently formed. Then, a magnetic material destined to form the upper magnetic core 24 is filled in the parts of the trench corresponding to the front part gap and the rear part gap and, at the same time, deposited to a desired thickness as by the spattering technique (a in FIG. 5). This filling of the magnetic material in the trench is desired to be carried out by the collimation spattering technique. The width of the trench 25a which determines the- recording track width $T_w$ is so set as to satisfy the relation of magnitude, $W_s > T_w > T_r$, as described above.

Subsequently, the magnetic material layer deposited as described above is patterned in a desired shape larger in width than the trench 25a to give rise to the upper magnetic core 24 (b in FIG. 5). After the magnetic material has been filled in the trench 25a having a depth smaller than the thickness of the upper magnetic core 24 and meanwhile deposited therein to the prescribed thickness, the leading end part of the upper magnetic core 24 is patterned in a width greater than the width of the trench 25a and, therefore, furnished with a protruding shape extended in the direction of the recording magnetic gap layer 23. Thereafter, electrodes are led out, a protective film is formed, a slidering treatment is performed, and works for attachment of a suspension and other similar articles are carried out to complete the separate recording-reproducing type magnetic head 29.

In the process for the production of the separate recording-reproducing type magnetic head 29 described above, since the upper shield layer 20 of the shield type MR head 21 is formed with part of the precursory magnetic material thereof embedded in the trench 19a, the upper shield layer 20 can be stably formed on the upper regenerating magnetic gap layer 18 having such a small thickness as 0.1 μm or less, for example. If the upper shield layer 20 is formed by the conventional milling technique, for example, the construction mentioned above will not be stably formed because this technique has the possibility of excessively etching the upper regenerating magnetic gap layer 18 having a thickness of not more than 0.1 μm and inflicting damage on the leads 16. Further, the protruding part of the upper magnetic core 24 can be stably produced because the upper magnetic core is manufactured by having the magnetic material thereof filled in the trench 25a and meanwhile patterned in a width greater than the width of the trench 25a. As a result, the induction type thin-film magnetic head 22 of a decreased track width and a decreased gap can be formed with high dimensional accuracy under conditions fully suitable for quantity production.

Figure 6:
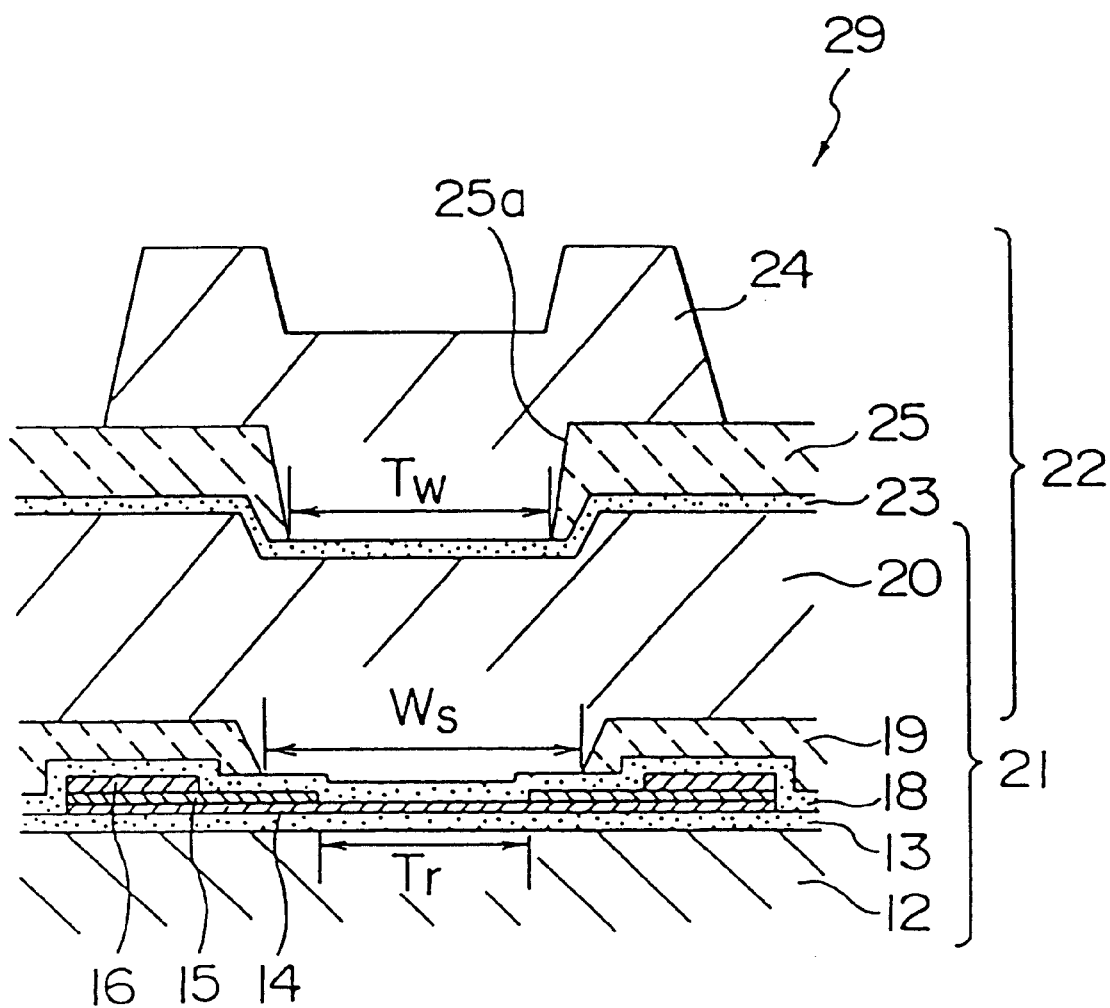
FIG. 6 is a cross section showing an example of modification of the separate recording-reproducing type magnetic head shown in FIG. 1.

Incidentally, in the separate recording-reproducing type magnetic head 29 of the embodiment described above, the size $T_r$ corresponding to the regenerating track width, the recording track width $T_w$, and the width $W_s$ of the surface of the upper shield layer 20 opposite the MR film are required to be so set as to satisfy the relation, $T_r < T_w < W_s$. When this requirement is satisfied, the step for flattening the surface of the upper shield layer 20 of the shield type MR head 21 may be omitted as shown in FIG. 6, for example. To be specific, if the step for flattening the surface of the upper shield layer 20 is omitted, the satisfaction of this relation, $T_w < W_s$, will enable the linearity of the recording magnetic gap to be maintained substantially throughout the entire recording track width and the satisfaction of this relation, $T_r < T_w$, will enable the off-track characteristic to be retained ideally during the course of regeneration. In the process of production described above, the item 3a can be machined accurately within 0.1 μm even when the recording track width is not more than 1 μm because the recording track width $T_w$ is definitely fixed by subjecting the insulating layer 25 made of such a material as $SiO_2$ which is suitable for fine machining and prepared in a state having a relatively small difference of level to the reactive ion etching technique.

Figure 7:
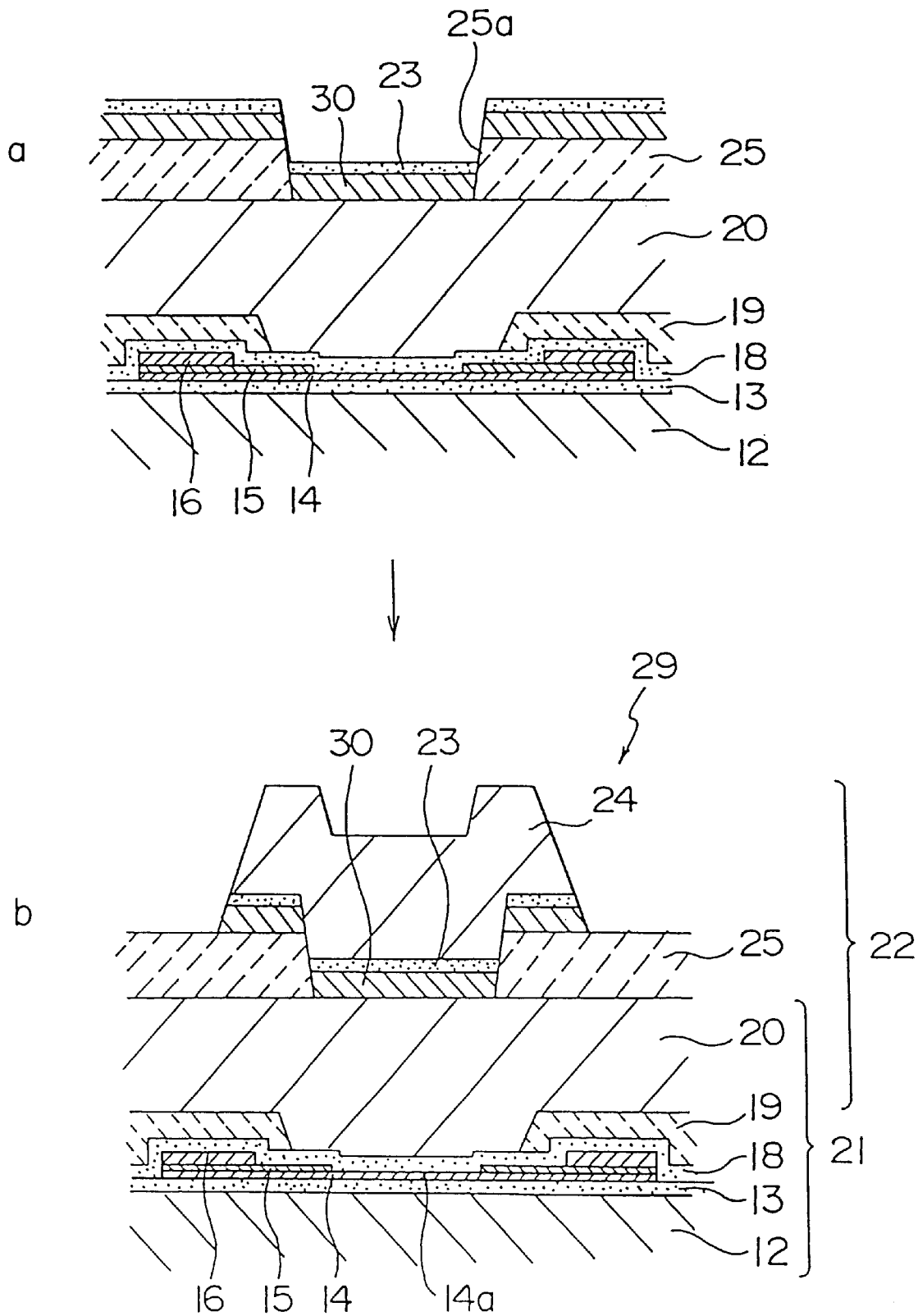
FIGS. 7a and b are a cross section showing the essential part of the construction and the production process of a separate recording-reproducing type magnetic head according to the second embodiment of this invention.

Now, the second embodiment of this invention will be explained below with reference to FIG. 7.

The separate recording-reproducing magnetic head 29 of this embodiment, particularly the induction type thin-film magnetic head 22 thereof, has formed inside the trench 25a inserted in the insulating layer 25 a three-layer construction formed of a magnetic material layer 30, the recording magnetic gap layer 23, and the upper magnetic core 24. Specifically, in the process for the production of the separate recording-reproducing type magnetic head shown in FIG. 4 and FIG. 5, the insulating layer 25 is formed prior to the formation of the recording magnetic gap layer 23 and then the trenches (including the trench 25a) corresponding to the front part gap and the rear part gap are formed. Inside these trenches (including the trench 25a), the magnetic material layer 30 destined to form part of the upper shield layer 20 serving concurrently as the lower magnetic core is formed in an embedded state and then the recording magnetic gap layer 23 is formed (a in FIG. 7). Subsequently, a magnetic material is embedded in the remaining parts of the trenches (including the trench 25a) and, at the same time, deposited therein to a desired thickness as by the spattering technique and the magnetic material layer is patterned to give rise to the upper magnetic core 24 (b in FIG. 7).

The record fringing can be diminished enough to benefit the exaltation of track densification by disposing inside the trench 25a the parts of the upper shield layer 20 concurrently serving as a lower magnetic core and the upper magnetic core 24 which are opposite the recording magnetic gap and substantially equalizing the widths of the surfaces of the upper and the lower magnetic core which are opposite the medium as described above.

Figure 8:
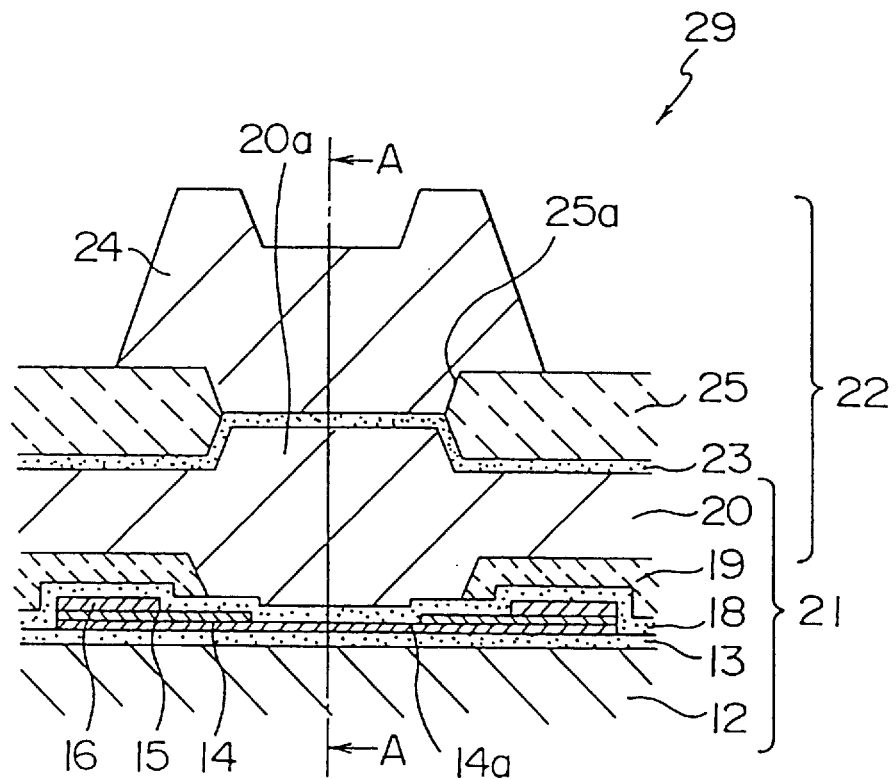
FIG. 8 is a cross section showing the construction of a separate recording-reproducing type magnetic head according to the third embodiment of this invention.
Figure 9:
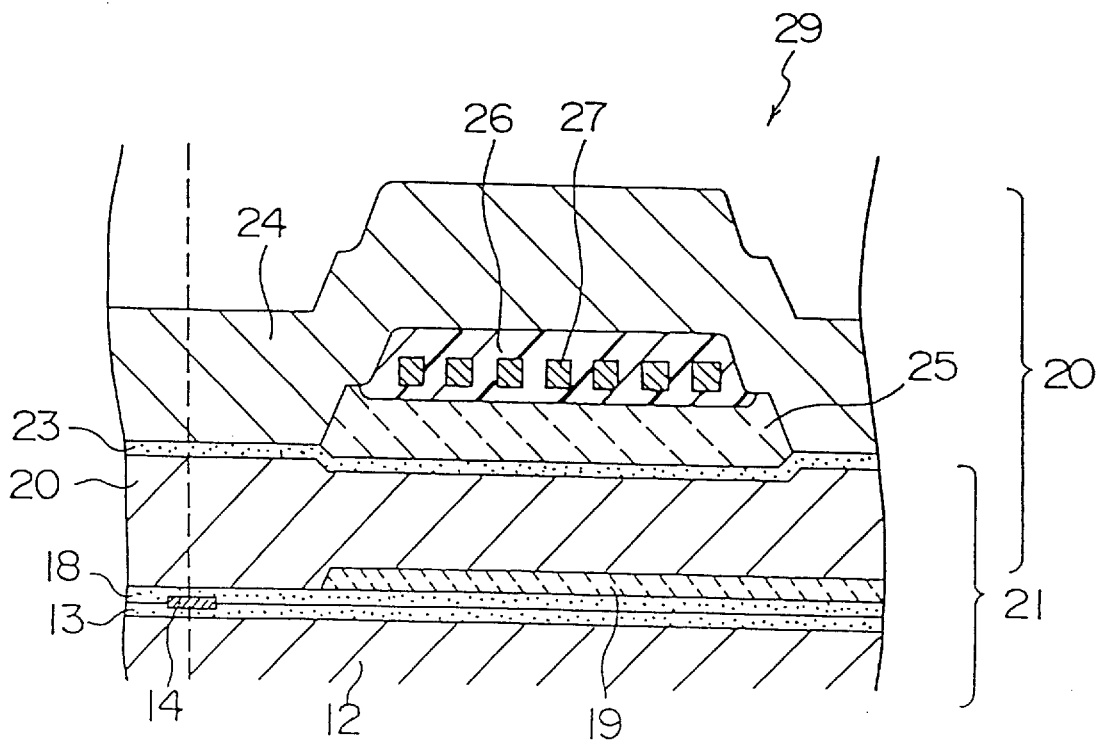
FIG. 9 is a diagram showing a cross section taken through the separate recording-reproducing type magnetic head shown in FIG. 8 across the line A—A.

FIG. 8 and FIG. 9 are diagrams showing the construction of a separate recording-reproducing type magnetic head according to the third embodiment of this invention. Also by adopting such a construction as is shown in these diagrams, the separate recording-reproducing type magnetic head 29, advantageous for the exaltation of track density, can be obtained similarly to the induction type thin-film magnetic head 22, according to the second embodiment described above.

Figure 4:
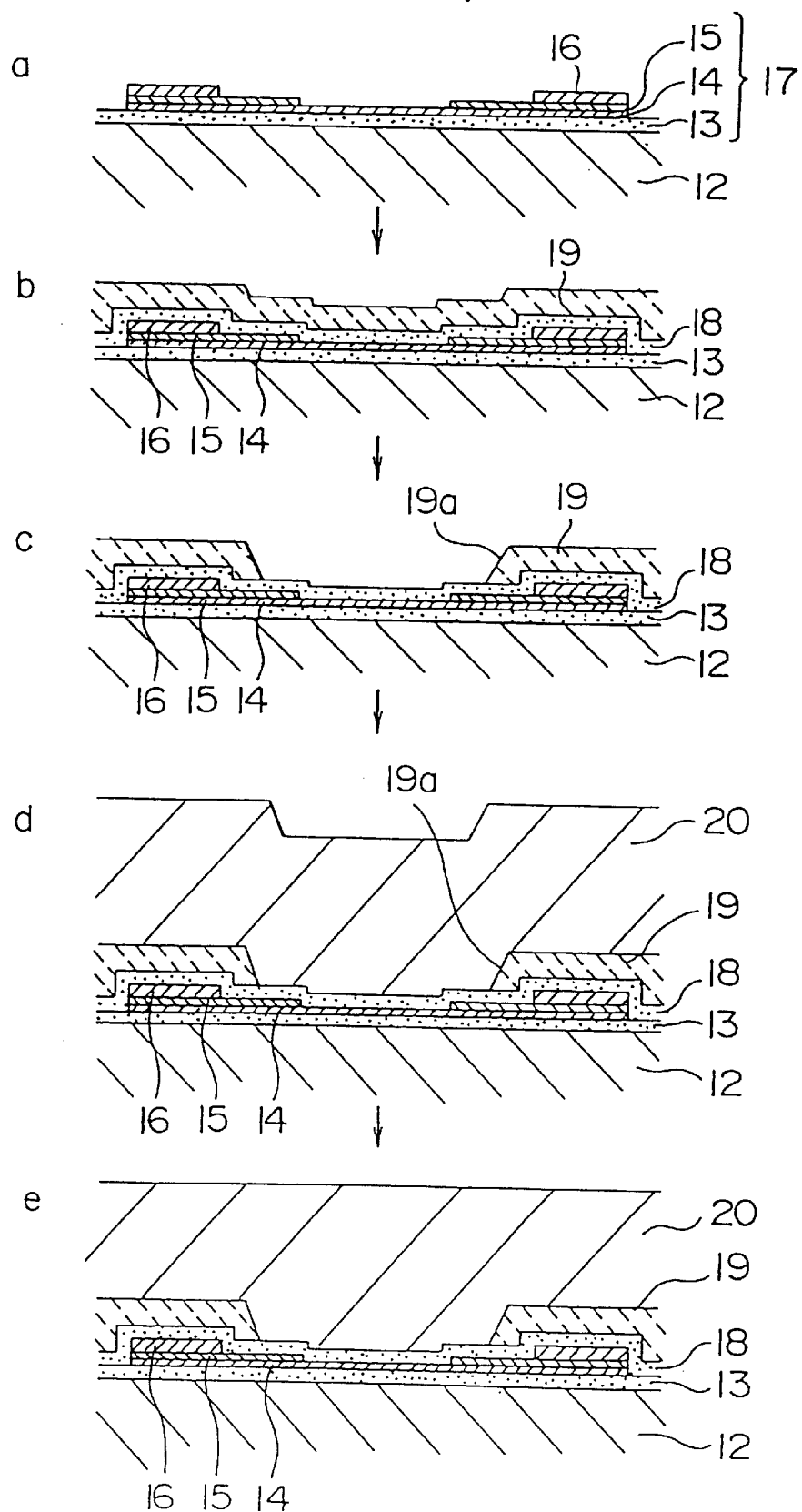
FIGS. 4a, b, c, d and e are a cross section showing part of a process for the production of the separate recording-reproducing type magnetic head shown in FIG. 1.
Figure 5:
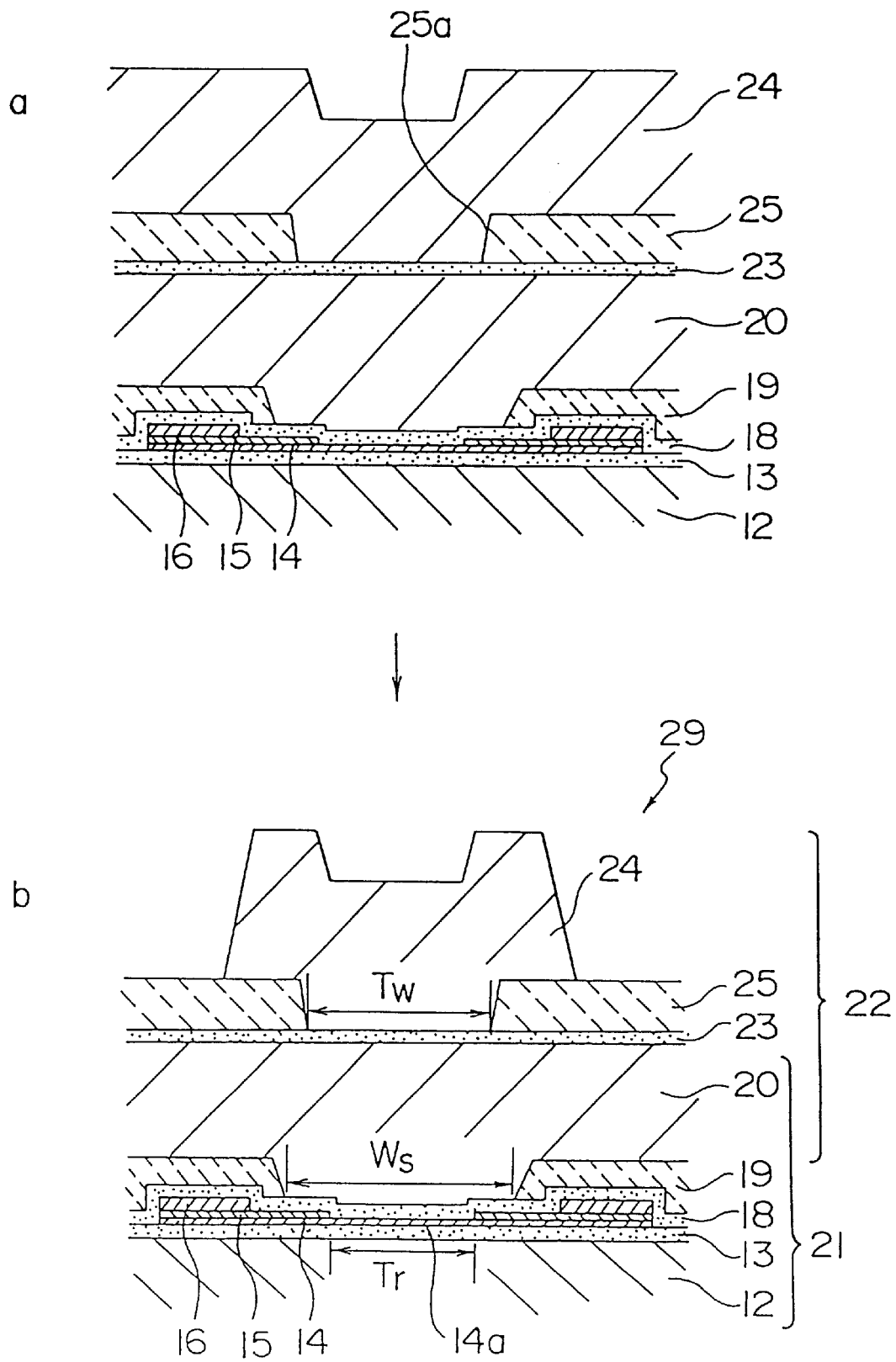
FIGS. 5a and b are a cross section showing the part of the process for the production of the separate recording-reproducing type magnetic head shown in FIG. 1, subsequent to the part of the process shown in FIG. 4.
Figure 10:
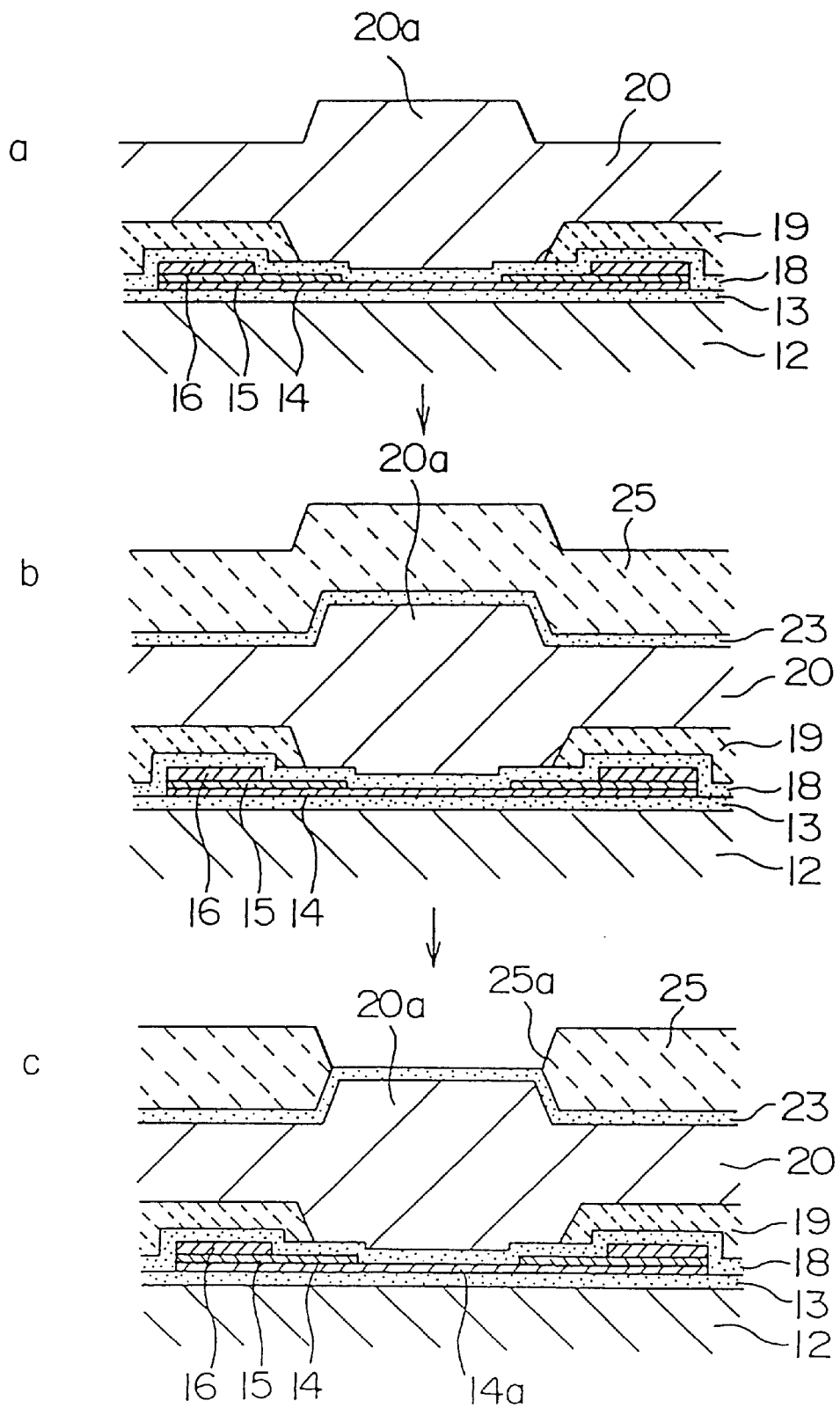
FIGS. 10a, b and c are a cross section showing the essential part of a process for the production of the separate recording-reproducing type magnetic head shown in FIG. 8.

Specifically, in the process for the production of the separate recording-reproducing type magnetic head shown in FIG. 4 and FIG. 5, first the magnetic material layer destined to form the upper shield layer 20, concurrently serving as a lower magnetic core, is formed and then a protruding part 20a is formed on the surface of the magnetic material layer as by the ion milling technique (a in FIG. 10). Then, on the upper shield layer 20 now possessing the protruding part 20a, the recording magnetic gap layer 23 and the insulating layer are sequentially formed in the order mentioned as by the spattering technique (b in FIG. 10). Then, the trenches (including the trench 25a) are formed in the insulating layer 25 at the positions of the protruding part 20a of the upper shield layer 20, namely in the part corresponding to the front part gap and the part corresponding to the rear part gap 23b (c in FIG. 10). Thereafter, the separate recording-reproducing type magnetic head 29, particularly the induction type thin-film magnetic head 22, shown in FIG. 8 and FIG. 9 can be obtained by forming the coil and the insulating layer and forming and patterning the upper magnetic core similarly to the embodiment described above.

Now, the four embodiment of this invention will be explained below with reference to FIG. 11.

Figure 11:
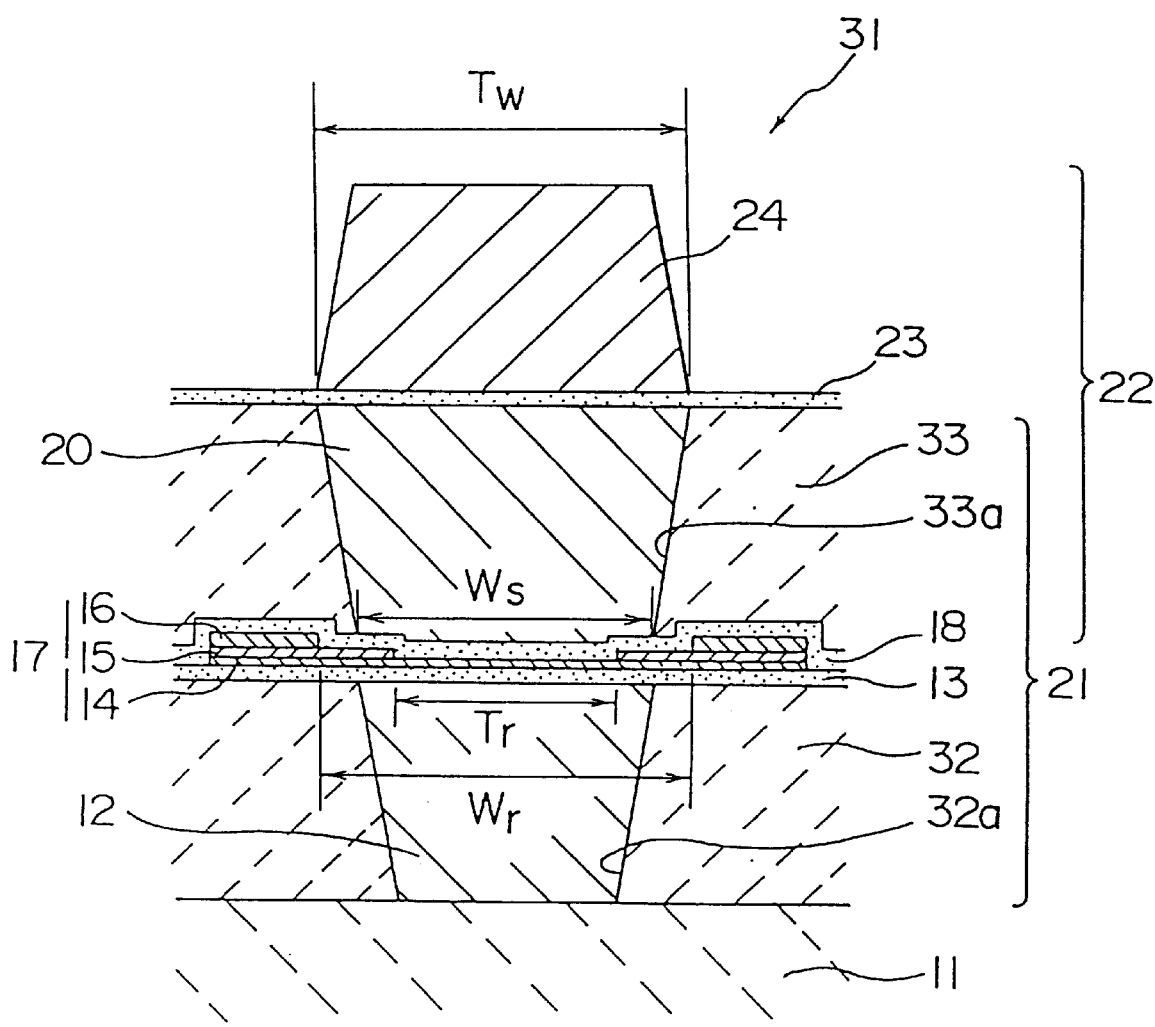
FIG. 11 is a cross section showing the construction of a separate recording-reproducing magnetic head according to the fourth embodiment of this invention.

In a separate recording-reproducing type magnetic head 31 shown in FIG. 11, the lower shield layer 12 and the upper shield layer 20 concurrently serving as a lower magnetic core are formed as completely embedded in trenches 32a, 33a. Specifically, insulating layers 32 and 33 are formed in thicknesses at least equal to the thicknesses of the lower shield layer 12 and the upper shield layer 20 concurrently serving as a lower magnetic core. The lower shield layer 12 and the upper shield layer 20 concurrently serving as a lower magnetic core are respectively obtained by forming the trenches 32a and 33a in the insulating layers 32 and 33, filling the material in the trenches 32a and 33a, and then flattening the surfaces thereof.

The separate recording-reproducing type magnetic head 31 of the present embodiment, similarly to the embodiment described previously except for the construction just mentioned, causes the width $W_s$ of the surface of the upper shield layer 20 opposite the MR film to be smaller than the distance $W_r$ between the leads 16 and utilizes the magnetically fixing film 15 for magnetically fixing the MR film 14 positioned at least outside the edges of the end parts of the surface of the upper shield layer 20 opposite the MR film. Further, it requires the width of the magnetic field responding part 14a of the MR film 14 (substantial width of the regenerating track) to be smaller than the width $W_s$ of the surface of the upper shield layer 20 opposite the magnetoresistance effect film. Incidentally, the upper magnetic core 24 may be furnished with a protruding shape relative to the recording magnetic gap layer 23 similarly to the embodiment described previously.

By the separate recording-reproducing type magnetic head 31 of the embodiment described above, similarly to that of the embodiment described previously, the decrease of the regenerating magnetic gap and the decrease of the track width can be attained. Further, by maintaining the linearity of the recording magnetic gap, a highly desirable off-track characteristic can be obtained during the course of regeneration.

The embodiments described thus far represent cases of implementing the magnetic fixation of the MR film by means of a magnetically fixing film. It is optional with the manufacturer to attain the magnetic fixation of the MR film by varying the composition of a component which is in need of magnetic fixation.

Now, the fifth embodiment of this invention will be explained below with reference to FIG. 12 and FIG. 13.

Figure 12:
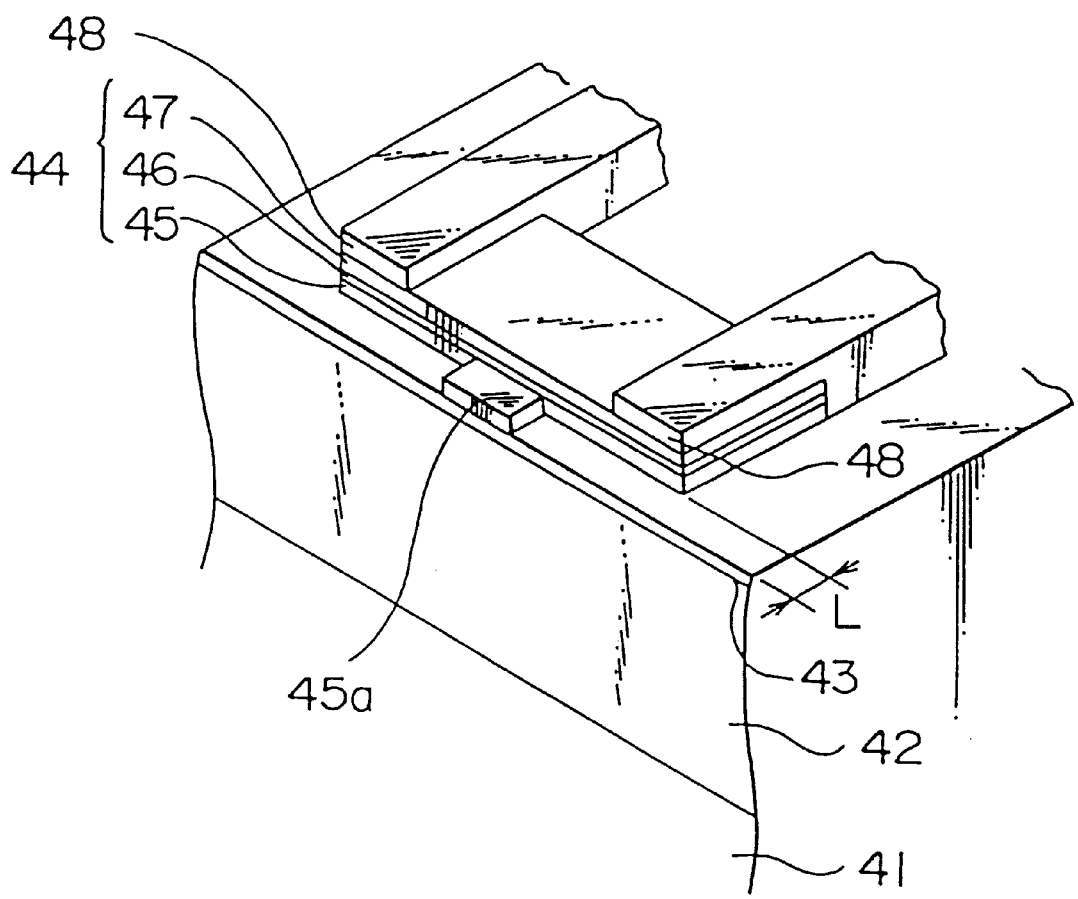
FIG. 12 is a perspective view showing the construction of the essential part of a MR head according to the fifth embodiment of this invention.
Figure 13:
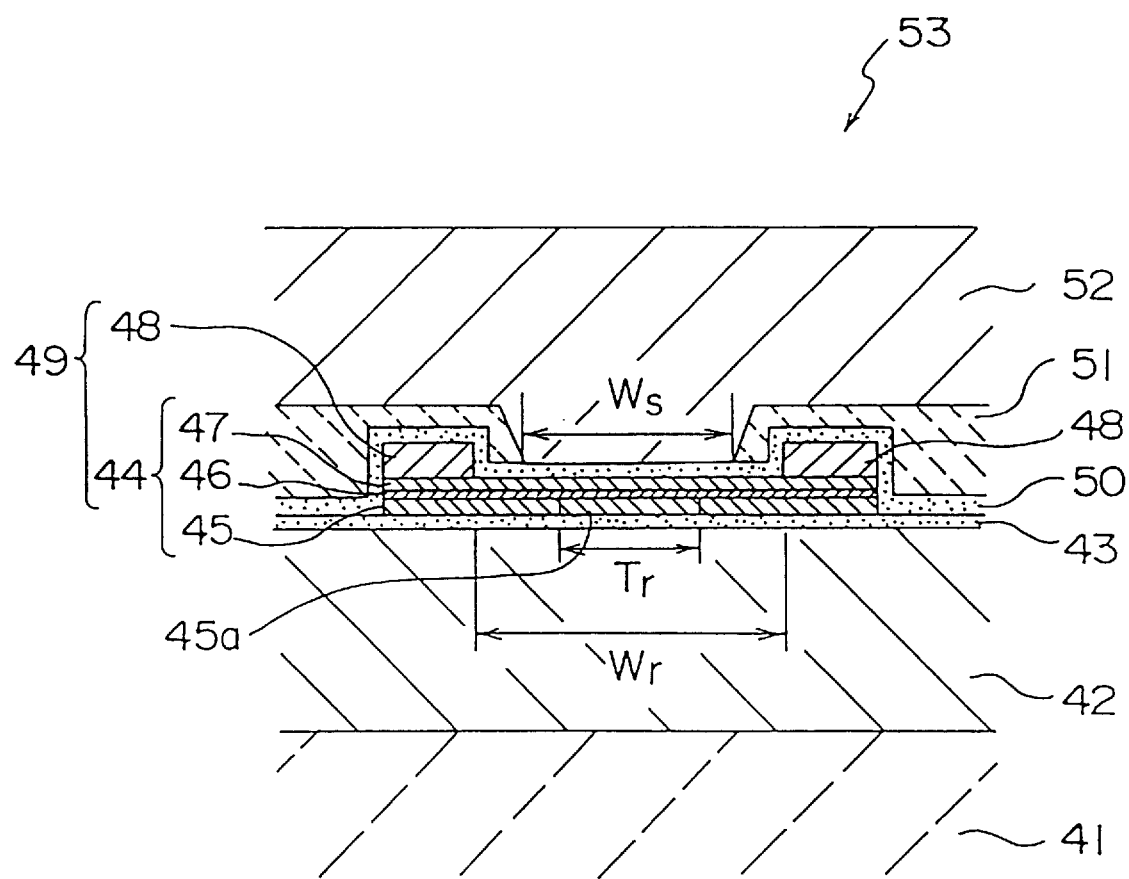
FIG. 13 is a front view of the MR head shown in FIG. 12.

FIG. 12 is a perspective view partially showing the construction of the MR head of the present embodiment and FIG. 13 is a front view of the MR head taken from the side opposite the medium. On a substrate 41, a lower shield layer 42 and a lower regenerating magnetic gap layer 43 are sequentially formed in the order mentioned in the same manner as in the embodiments described above. On the lower regenerating magnetic gap layer 43, a spin valve film having a three-layer laminate construction of first magnetic film (such as, for example, $Co_{90}Fe_{10}$ film) 45/nonmagnetic film (such as, for example, Cu film) 46/second magnetic film (such as, for example, $Co_{90}Fe_{10}$ film) 47 is formed as a MR film 44.

The second magnetic film 47 on the upper side is fixed magnetically as with an antiferromagnetic film made as of FeMn film or NiO film or a hard ferromagnetic film made as of CoPt film which is omitted from illustration here. The first magnetic film 45 on the lower side is exclusively caused by an external magnetic field (signal magnetic field) to change direction of magnetization. As a result, the relative angle formed by the directions of magnetization of the two magnetic films 45 and 47 is varied to give rise to magnetoresistance.

The first magnetic film 45 on the lower side in the MR film (spin valve film) 44 is furnished with a protruding part 45a extended in the direction of the surface opposite a medium. It is recessed from the surface opposite the medium except for the protruding part 45a. In other words, only the leading end surface of the protruding part 45a forms the surface opposite the medium. The nonmagnetic film 46 and the second magnetic film 47 are formed as superposed on the part of the first magnetic layer 45 except for the protruding part 45a. They are recessed from the surface opposite the medium similarly to the part of the first magnetic layer 45 except for the protruding part 45a.

A pair of leads 48 are severally formed on the second magnetic film 47 which is recessed from the surface opposite the medium. These components jointly form a MR element 49. Thus, the protruding part 45a of the first magnetic film 45 exclusively responds to an external magnetic field (signal magnetic field) because the MR element 49 is recessed from the surface opposite the medium except for the protruding part 45a of the first magnetic film 45. As a result, the protruding part 45a of the first magnetic film 45 constitutes a magnetic field responding part and the width $T_r$ of the magnetic field responding part forms the width of the protruding part 45a.

On the MR element 49, an upper regenerating magnetic gap layer 50 and insulating layers 51 for securing dielectric strength between the lead 48 and an upper shield layer 52 are formed. The insulating layers 51, similarly to the various embodiments described above, are so formed as to cover the upper surface of the lead 48. The upper shield layer 52 is formed as partly embedded in a trench 51a which is formed in the insulating layers 51. These components jointly form a shield type MR head 53 which functions as a regenerating head.

The width $W_s$ of the surface of the upper shield layer 52 opposite the MR film is defined by the width of the trench 51a which is formed, similarly to the various embodiments described above, in the insulating layers 51. The trench 51a is so shaped that the width $W_s$ of the surface opposite the MR film may be smaller than the distance $W_r$ between the leads 48. In other words, the pair of leads 48 are disposed each outside the edges of the end parts of the surface of the upper shield layer 52 opposite the MR film. Further, the first magnetic film 45 is so patterned that the width $T_r$ of the magnetic field responding part (the width of the protruding part 45a) may be smaller than the distance $W_r$ between the leads 48 and the width $W_s$ of the surface of the upper shield layer 52 opposite the MR film.

In the shield type MR head 53 which is constructed as described above, the width $W_s$ of the surface of the upper shield layer 52 opposite the MR film is caused to be smaller than the distance between the leads 48 and the pair of leads 48 are disposed each outside the edges of the end parts of the surface opposite the MR film. As a result, the substrate underlying the surface of the upper shield layer 52 opposite the MR film may be flattened to a notable extent similarly to the various embodiments described above. This is because the effect which the thicknesses of the insulating layers 51 and the leads 48 exerts on the substrate underlying the surface of the upper shield layer 52, opposite the MR film, can be eliminated in spite of the formation of the insulating layers 51 which secure dielectric strength between the leads 48 and the upper shield layer 52. Thus, the dielectric strength between the leads 48 and the upper shield layer 52 is secured by the formation of the insulating layers 51, and the insulation between the MR film (spin valve film) 44 and the upper shield layer 52 in the magnetic field responding part of the MR film (spin valve film) 44 is attained by the upper regenerating magnetic gap layer 50 of a small thickness. This fact implies that the decrease of the gap to such a small size as not more than 0.1 $\mu$m, for example, can be attained herein.

Further, the magnetic field responding part is formed of the protruding part 45a of the first magnetic film 45 and the other part of the MR film 44 is recessed from the surface opposite the medium and the width $T_r$ of the magnetic field responding part is caused to be smaller than the distance $W_r$ between the leads 48 and the width $W_s$ of the surface of the upper shield layer 52 opposite the MR film as well. Even when the width $W_s$ of the surface of the upper shield layer 52 opposite the MR film is caused to be smaller than the distance $W_r$ between the leads 48 and this width $W_s$ of the upper shield layer 52 is caused to extend throughout the entire direction of its thickness, therefore, such defects as the occurrence of noise due to leakage of a magnetic flux from adjacent loops of track or from a motor can be prevented and, as a result, the decrease of track width can be realized without entailing degradation of the regenerating characteristic.

Figure 14:
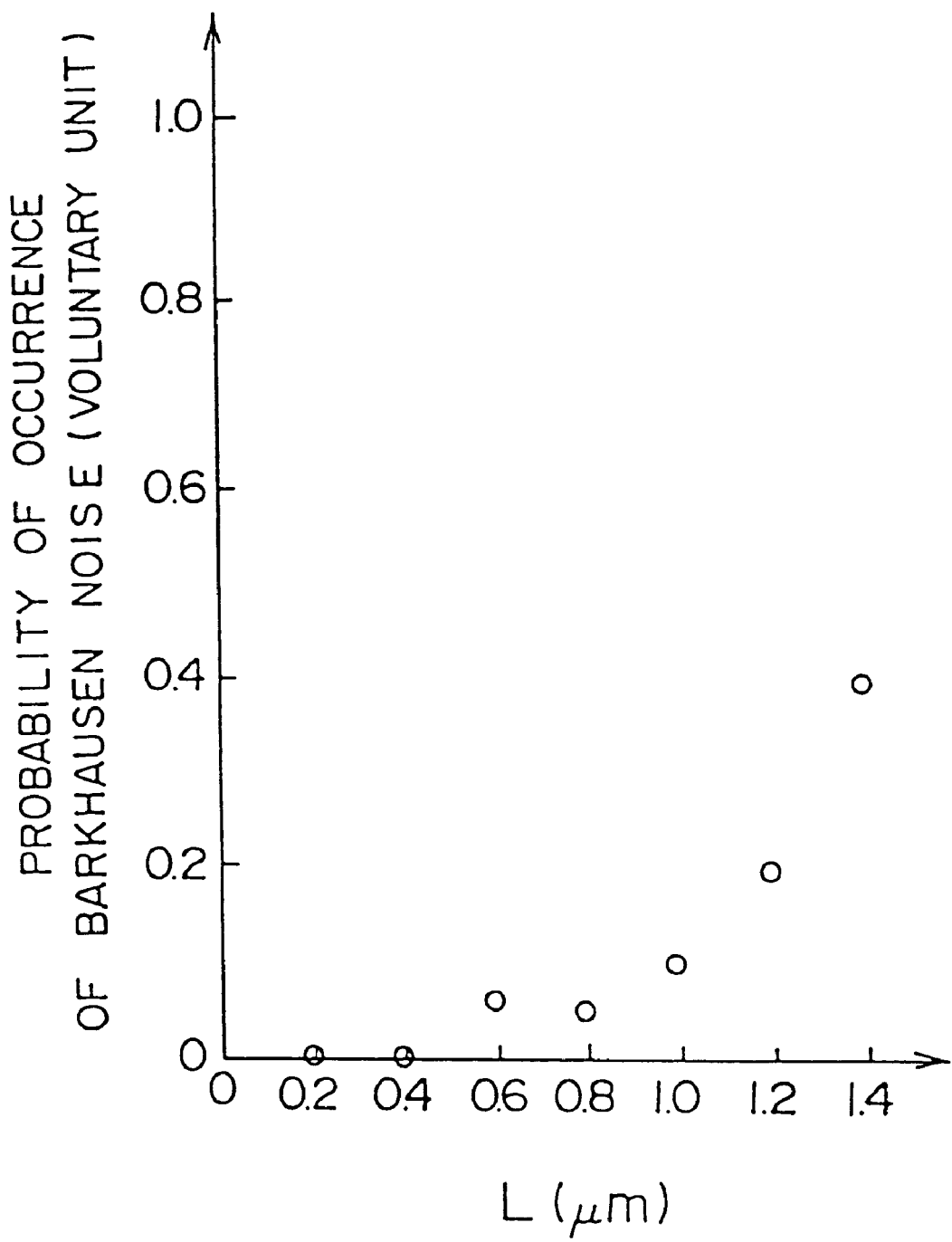
FIG. 14 is a characteristic diagram showing the relation between the length L of a protruding magnetic field responding part and the probability of occurrence of Barkhausen noise.

FIG. 14 shows the results of a test performed to determine the relation between the length L of protrusion of the protruding part 45a destined to form the magnetic field responding part and the probability of occurrence of Barkhausen noise where the width $T_r$ of the magnetic field responding part was 2 $\mu$m and the distance $W_r$ between the leads was 5 $\mu$m. In this case, the isolation of the domain of the first magnetic film 45 was attained by disposing a CoPt film 40 nm in thickness at a position directly below the lead 48. It is clearly noted from FIG. 14 that substantial elimination of Barkhausen noise is attained by decreasing L to below 1.0 $\mu$m. Since the accuracy of alignment of the stepper is roughly within ±0.1 $\mu$m when the lead 48 is also recessed as shown in FIG. 12, it is theoretically inferred that the lead 48 will be completely recessed from the surface opposite the medium when L is 0.1 or over. Actually, L is desired to be not less than about 0.23 $\mu$m $(=\{(0.1)^2+(0.2)^2\}^{0.5})$ in due consideration of the error of the polishing work which is about ±0.2 $\mu$m. Thus, L is desired to be in the range of from 0.1 to 1.0 $\mu$m, practically in the range of from 0.23 to 1.0 $\mu$m. L is desired to exceed roughly the distance between the MR film (spin valve film) 44 and the upper shield layer 52 in the part of the lead 48, for this size allows prevention of the noise due to the disturbance of a magnetic field in the z direction.

The protruding part 45a of the first magnetic film 45 is desired to be so shaped that the part thereof, which is connected to the part recessed from the surface opposite the medium may have a larger width than the width of the leading end face forming the surface opposite the medium. Owing to this shape of the protruding part 45a, the magnetization of the magnetic field responding part can be easily turned toward the direction of the track width and, at the same time, the occurrence of Barkhausen noise due to domain wall shift can be curbed.

Further, the short circuit between the MR film 44 and the upper shield layer 52 can be generally prevented by causing the lead 48 also to be recessed from the surface opposite the medium as described above because this recess eliminates possible sagging of the lead on the surface opposite the medium. Besides, the corrosionproofness and consequently the reliability of the lead 48 can be attained by causing the lead 48 which is deficient in corrosionproofness and the antiferromagnetic film intended for magnetic fixation of the second magnetic film 47 to be recessed from the surface opposite the medium.

Figure 15:
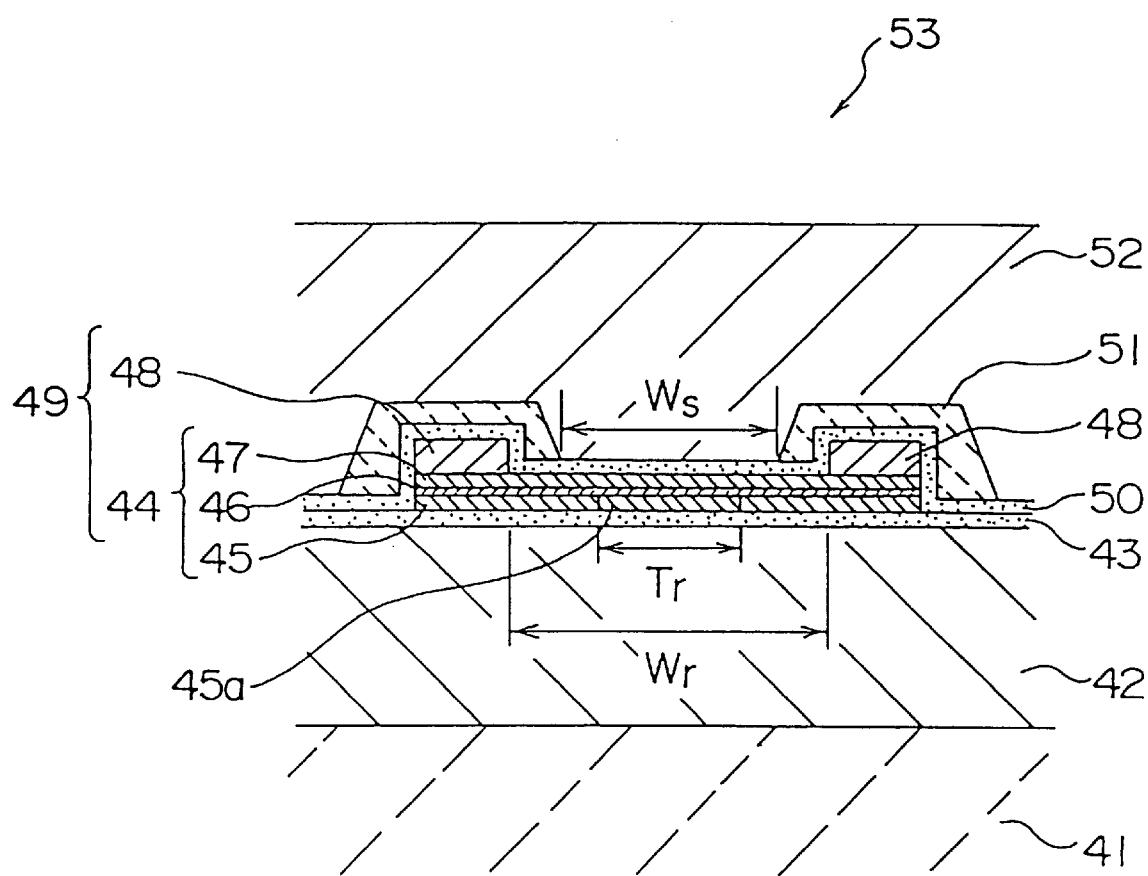
FIG. 15 is a front view showing an example of modification of the MR head shown in FIG. 12.

The insulating layers 51 serving to secure dielectric strength between the leads 48 and the upper shield layer 52 may be so formed as to cover the leads 48 exclusively as shown in FIG. 15. In other words, the upper shield layer 52 may be formed in the general shape of the letter M. This arrangement further ensures the prevention of such defects as noise because it provides the magnetic field in each loop of the track with a perfect shield against that in an adjacent loop.

The MR head 53 of the fifth embodiment can be manufactured in the same manner as the MR head of any of the embodiments described above.

For example, the lower shield layer 42 and the lower magnetic gap layer 43 are formed as by the spattering technique on the substrate 41. Further, the first magnetic film 45, the nonmagnetic film 46, and the second magnetic film 47 jointly destined to form a spin valve film, an antiferromagnetic film, etc. are formed sequentially in the order mentioned as by the vacuum deposition technique. In this case, the deposition of a noble metal film as a protective film on the spin valve film proves to be an effective measure.

Then, the superposed films, as far as the nonmagnetic film 46, are patterned from the side opposite the medium in the shape conforming to the recessed part as by the ion milling technique. Then, a resist mask is laid on the same part as is involved in the patterning mentioned above and on the part corresponding to the protruding part 45a of the first magnetic film 45 and, with the aid of the resist mask, the unnecessary part of the first magnetic film 45 is removed to give the protruding part 45a the required shape. Thereafter, the formation of the leads 48, the upper regenerating magnetic gap layer 50, and the insulating layer 51, the formation of the trench 51a, the formation of the upper shield layer 52, etc. are sequentially implemented in the order mentioned in the same manner as in any of the various embodiments described above.

Now, the sixth embodiment of this invention will be explained below with reference to FIG. 16.

In the fifth embodiment described above, the magnetic field responding part is formed by causing part of the first magnetic film 45 in the spin valve film destined to serve as the MR film 44 to be partially protruded. The magnetic field responding part formed of a protruded part does not need to be limited to this method of formation. In a MR head 54 shown in FIG. 16, the MR film 44 is formed by setting a soft magnetic film 55 continuously to the first magnetic film 45 in the spin valve film which has the direction of magnetization thereof varied by an external magnetic field (signal magnetic field). The soft magnetic film 55 is magnetically interconnected with the first magnetic film and is provided with a protruding part 55a extended in the direction of the surface opposite the medium. The MR element 49 is recessed from the surface opposite the medium except for the protruding part 55a. In the present embodiment, the protruding part 55a of the soft magnetic film 55 forms a magnetic field responding part. Except for the particular alterations shown above, the construction of the present embodiment is identical with that of the fifth embodiment.

The same effect as is obtained by the fifth embodiment is produced by forming the magnetic field responding part with the protruding part 55a of the soft magnetic film 55 which is magnetically interconnected with the first magnetic film of the spin valve film as described above. The protruding part 55a of the soft magnetic film 55 is desired to have the same shape as the protruding part 45a of the first magnetic film 45 in the fifth embodiment.

The soft magnetic film 55 is desired to be formed of a soft magnetic material possessing higher resistance than the first magnetic film 45. To be specific, the soft magnetic film 55 is desired to possess a specific resistance of not less than 100 $\mu\Omega$m, for this high specific resistance suffices to preclude the otherwise possible partial diversion of electric current into the soft magnetic film 55. The materials desirably used for the soft magnetic film 55 include NiFe alloy, NiFeCo alloy, alloys obtained by combining these magnetic alloys with such additive elements as Ti, V, Cr, Mn, Zn, Nb, Mo, Tc, Hf, Ta, W, and Re and consequently furnished with increased resistance, and alloys obtained by combining Co with the same additive elements and consequently furnished with amorphous or microcrystalline texture, for example. The amorphous magnetic alloys and microcrystalline magnetic alloys obtained as described above generally manifest high resistance.

The thickness of the soft magnetic film 55 is desired to be in the approximate range of from 5 to 50 nm. If the thickness of the soft magnetic film 55 is less than 5 nm, then the responsiveness to the signal magnetic field will tend to decline unduly. Conversely, if the thickness of the soft magnetic film 55 exceeds 50 nm, the partial diversion of electric current will occur in the soft magnetic film 55 and possibly entail decline of sensitivity even when the soft magnetic film 55 is made of a material of high resistance.

Figure 16:
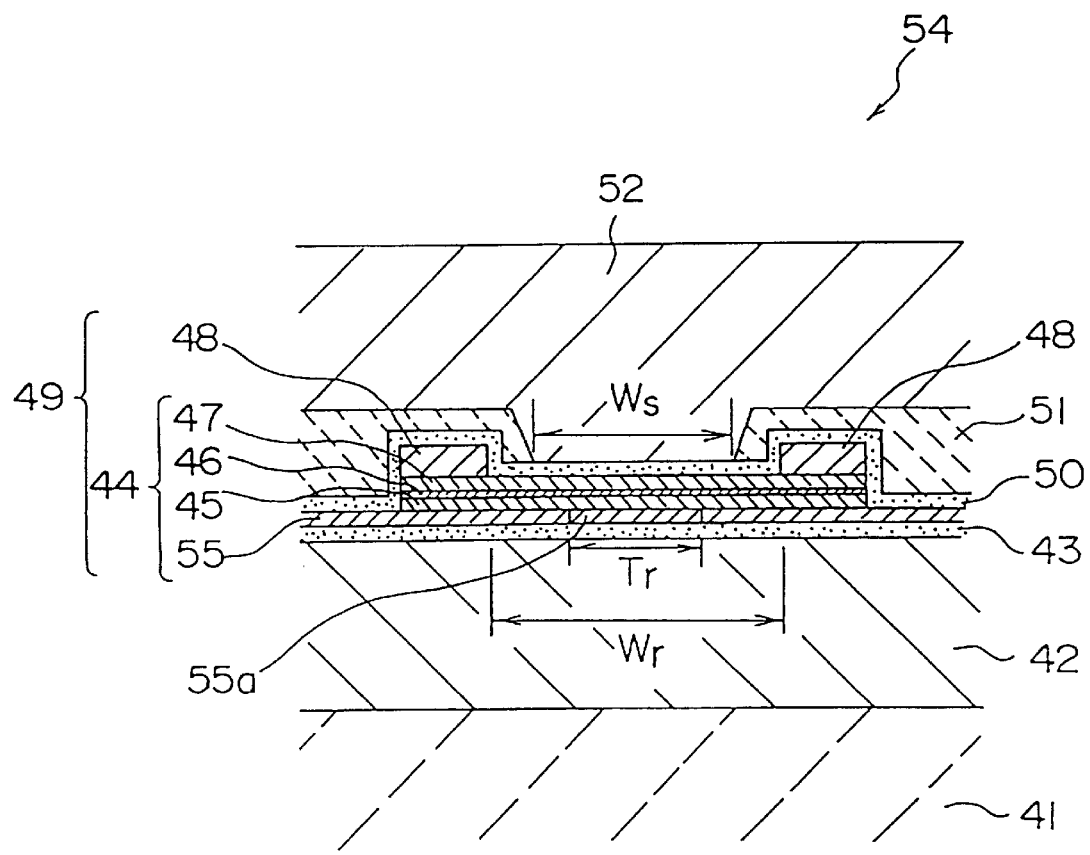
FIG. 16 is a front view showing the construction of a MR head according to the sixth embodiment of this invention.

Further, when the soft magnetic film 55 is formed in a larger area than the spin valve film as shown in FIG. 16, it is easily enabled to establish contact with the antiferromagnetic film serving to isolate the domain of the spin valve film and with the hard magnetic film.

Incidentally, the fifth and the sixth embodiment represent cases of using a spin valve film as the MR film. It is optional with the manufacturer to use an anisotropic magnetoresistance effect film and a artificial lattice film instead. When the magnetic field responding part to be used is formed of a protruding part, however, since the sense current is curved in the protruding part, it is particularly desirable to use a spin valve film or a artificial lattice film the magnitude of resistance of which does not depend on the angle to be formed between the sense current and the direction of magnetization of film.

The fifth and the sixth embodiment have been described exclusively with respect to the MR head. Optionally, the same induction type thin-film magnetic heat as used in the first to the fourth embodiment may be formed on the MR head of the fifth and the sixth embodiment and the resultant combination may be used similarly as a separate recording-reproducing type magnetic head. The separate recording-reproducing type magnetic head using the MR head of the fifth and the sixth embodiment, similarly to that of the first to the fourth embodiment, befits a system vested with an increased recording density and serves to enhance recording-reproducing characteristics as well.

When the magnetic material layer such as the lower shield layer or the upper shield layer concurrently serving as a lower magnetic core is formed as partly embedded in a trench as in any of the embodiments described above, it is desirable to form the trench in a shape containing a plurality of steps and impart the magnetic material layer a multi-step tapered cross section. By this arrangement, the magnetic material layer can be infallibly formed with high repeatability without entailing the occurrence as of gross porosity. Now, the method for the production of the magnetic material layer provided with such a multi-step tapered cross section will be described below. The examples to be cited below invariably represent a case of using a completely filled trench. The method illustrated thereby nevertheless holds good for the magnetic material layer which is partly embedded in the trench.

Figure 17:
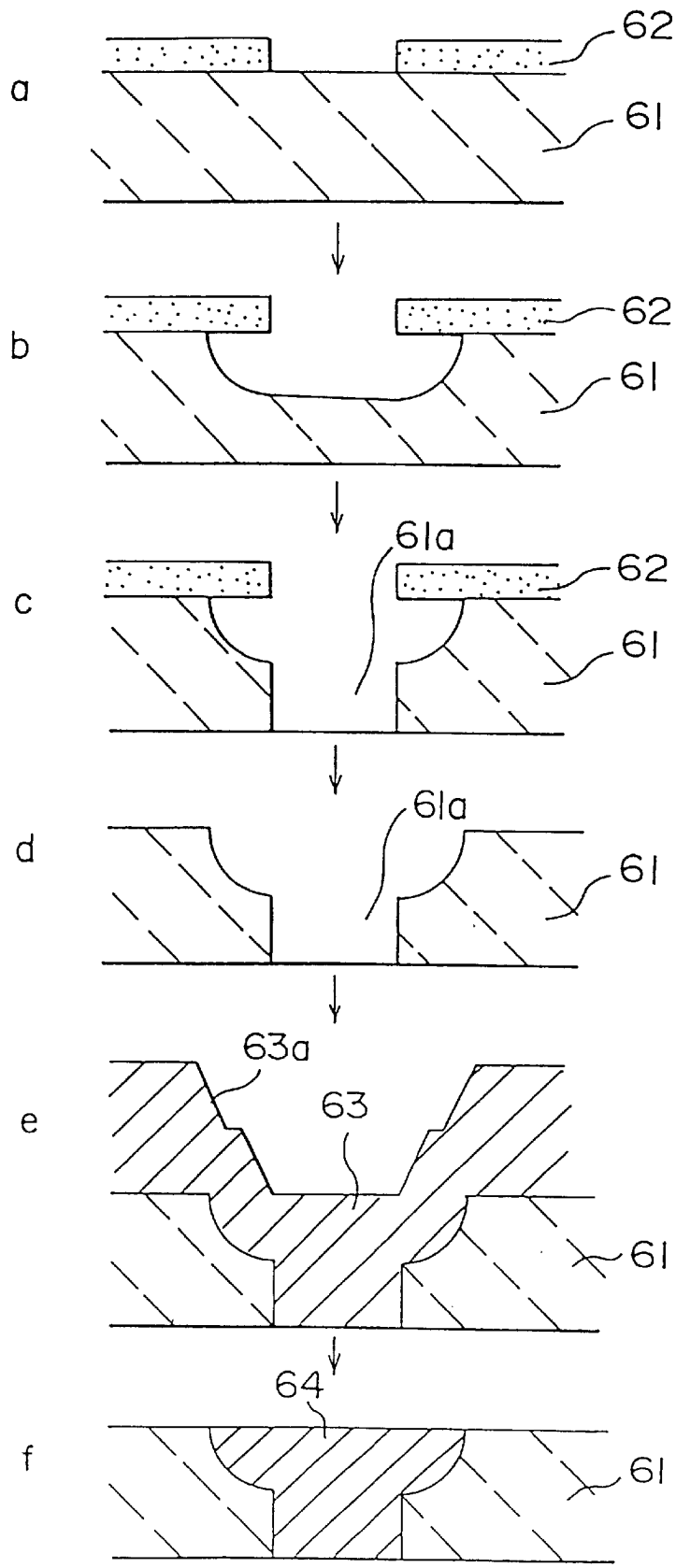
FIGS. 17a, b, c, d, e and f are a cross section showing a process for the production of a completely embedded magnetic material layer.

As shown in FIGS. 17a, b, c, d, e and f, for example, a resist 62 is formed on a trench-forming insulating layer 61 made as of $SiO_2$ (a in FIG. 17) and the insulating layer 61 is subjected to a chemical dry etching (CDE) treatment using a $CF_4$ gas (b in FIG. 17). This CDE is allowed to proceed to halfway along the thickness of the insulating layer 61 and then followed by a reactive ion etching (RIE) treatment to complete a trench 61a (c in FIG. 17). By the joint use of CDE and RIE in the manner described above, the trench 61a can be formed in a two-step tapered cross section.

Then, the resist 61 is removed (d in FIG. 17) and a magnetic material 63 such as of CoZrNb is filled in the trench 62a as by the spattering technique (e in FIG. 17). In this case, a taper 63a can be imparted to the magnetic material 63 as shown in e in FIG. 17 by conferring a bias of about 0.1 W/cm$^2$ on the spatter. By flattening the surface of the magnetic material 63 thereafter, a magnetic material layer 64 completely embedded in the trench 61a and furnished with the two-step tapered cross section is obtained.

The process of production described above allows the magnetic material layer 64 to be obtained in a perfect state without containing such defects as gross porosity because the magnetic material 63 is embedded in the trench 61a having a two-step tapered cross section. The use of a collimation spattering technique in this case can further improve the state of embedment of the magnetic material 63. Further, owing to the use of the trench 61a having the two-step tapered cross section, the magnetic material layer 64 having a protrusion-containing cross section fit for the upper magnetic core of the induction type thin-film magnetic head can be formed.

Figure 18:
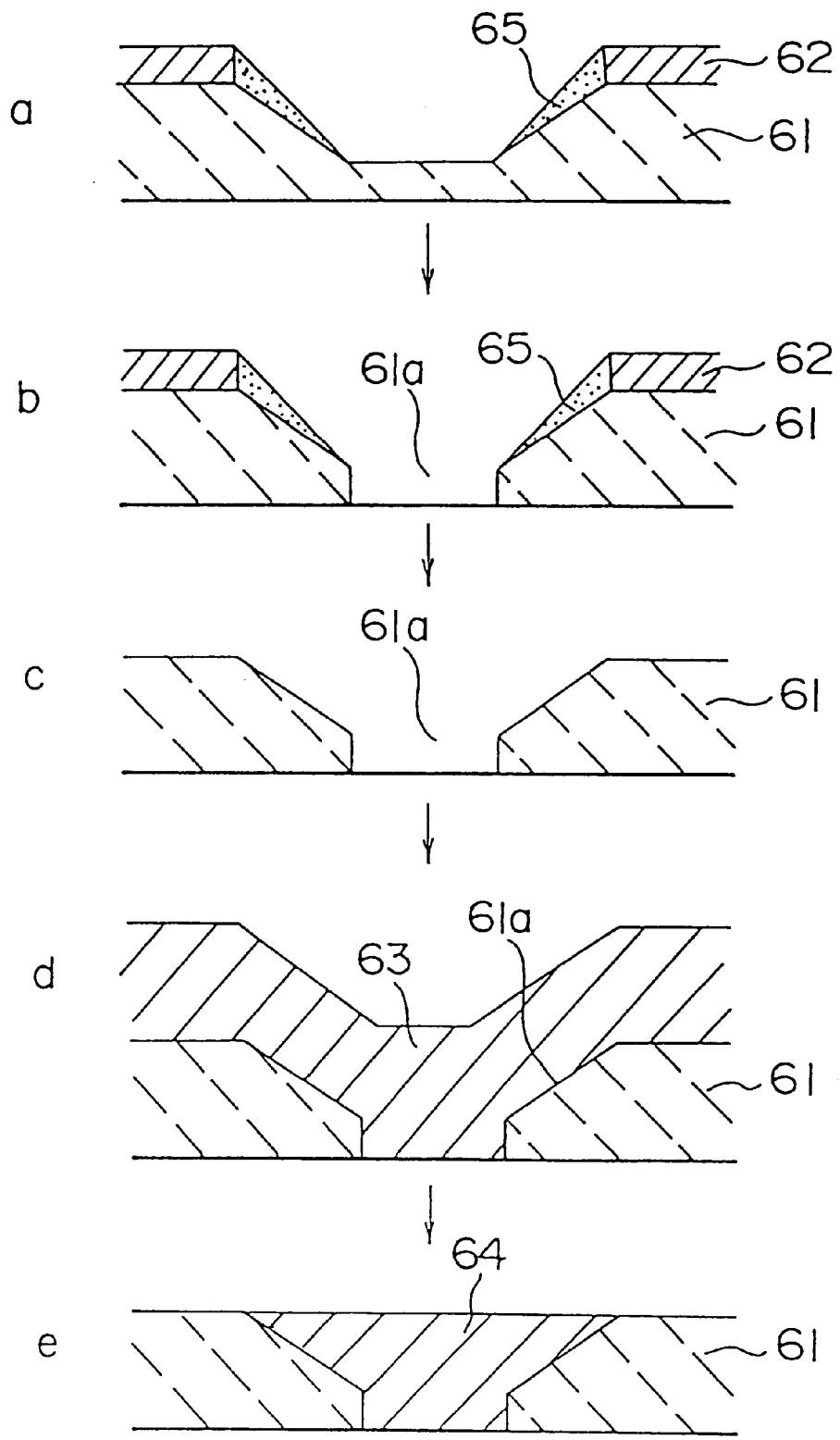
FIGS. 18a, b, c, d and e are a cross section showing another process for the production of a completely embedded magnetic material layer.

FIGS. 18a, b, c, d and e show another example of the embedding work. In the same manner as in the example of production cited above, the resist 62 is formed on the insulating layer 61 made as of SiO$_2$ and then the RIE treatment is performed by the use of the CHF$_3$ gas so as to cool the substrate to about 273 K and, at the same time, etch the insulating layer 61 to halfway along the thickness thereof. In this case, the taper is imparted by cooling the substrate to about 273 K thereby forming a deposit 65 on the lateral walls of the etched cavity (a in FIG. 18). Then, the RIE treatment as with CF$_4$ gas is performed to etch the insulating layer 60 vertically this time to complete the trench 61a of a two-step tapered cross section (b in FIG. 18).

The resist 61 is removed (c in FIG. 18) and then the magnetic material 63 as of CoZrNB is filled in the trench 61a as by the spattering technique (d in FIG. 18). The magnetic material layer 64 completely embedded in the trench 61a and furnished with the two-step tapered cross section is obtained by flattening the surface of the magnetic material 63 thereafter (e in FIG. 18).

Also in this method of production of the magnetic material layer 64, the magnetic material layer 64 can be formed can be formed as embedded in a perfect state without entailing the occurrence of such defects as gross porosity. When films of two kinds of material such as, for example, SiO$_2$ and Si which have different etching properties are superposed in the order mentioned and the resultant laminate is used as the insulating layer 61, the magnetic material layer 64 furnished with the same two-step tapered cross section will be obtained if the step of operation shown in b in FIG. 18 or c in FIG. 18, for example, is omitted.

Figure 19:
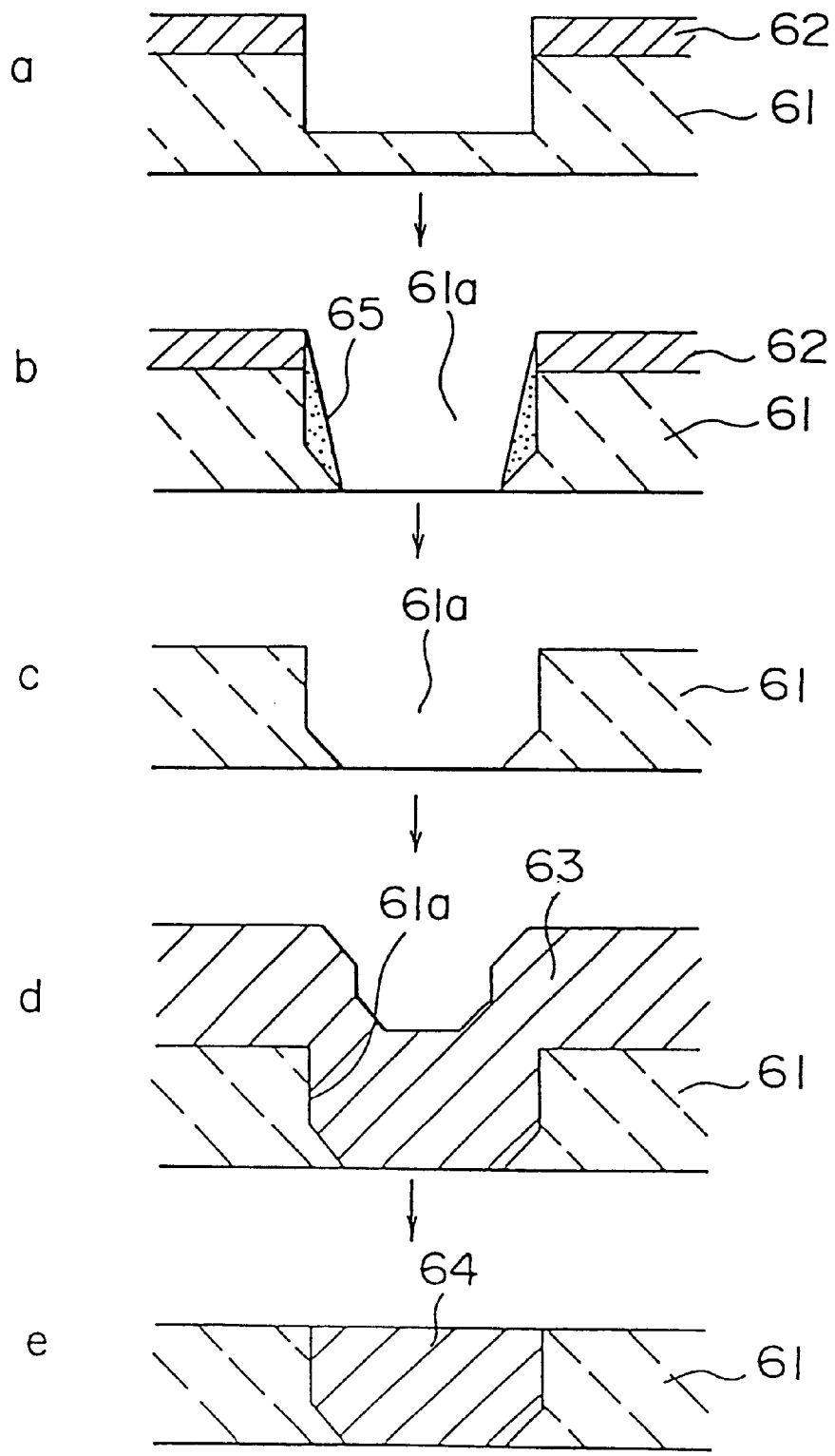
FIG. 19 is a cross section showing yet another process for the production of a completely embedded magnetic material layer.

FIGS. 19a, b, c, d and e depict another example of the embedding operation. In the same manner as in the example of production cited above, the resist 61 is formed on the insulating layer 61 made as of SiO$_2$ and then the RIE treatment as with CF$_4$ gas is carried out to etch the insulating layer 61 to halfway along the thickness thereof (a in FIG. 19). Subsequently, the RIE treatment as with the CHF$_3$ gas is carried out to cool the substrate to about 0° C. and, at the same time, etch the insulating layer 61 in a tapered cross section while forming the deposit 65 on the lateral walls of the etched cavity. Consequently, the trench 61a furnished with a two-step tapered cross section is formed (b in FIG. 19).

Then, the resist 61 is removed (c in FIG. 19) and the magnetic material 63 as of CoZrNb is filled in the trench 61a as by the spattering method (d in FIG. 19). Thereafter, the magnetic material layer 64 completely embedded in the trench 61a and furnished with a two-step tapered cross section is obtained by flattening the surface of the magnetic material 63 (e in FIG. 19).

Also in this method of production of the magnetic material layer 64, the magnetic material layer 64 can be formed as embedded in a perfect state without entailing the occurrence of such defects as gross porosity. When films of two kinds of material such as, for example, SiO$_2$ and Si which have different etching properties are superposed in the order mentioned and the resultant laminate is used as the insulating layer 61, the magnetic material layer 64 furnished with the same two-step tapered cross section will be obtained if the step of operation shown in b in FIG. 19 or c in FIG. 19, for example, is omitted.

Figure 20:
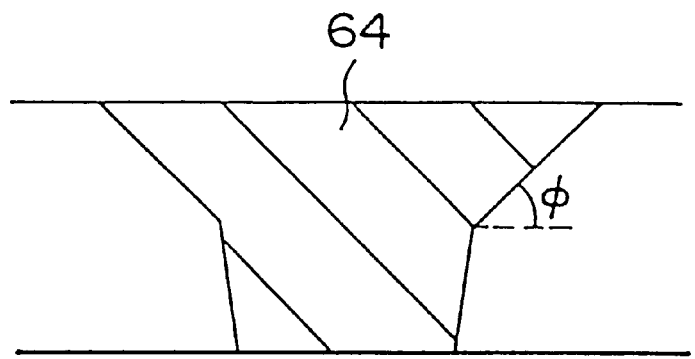
FIG. 20 is a diagram to aid in the explanation of the effect of curbing the occurrence of gross porosity in the completely embedded magnetic material layer shown in FIG. 18.
Figure 21:
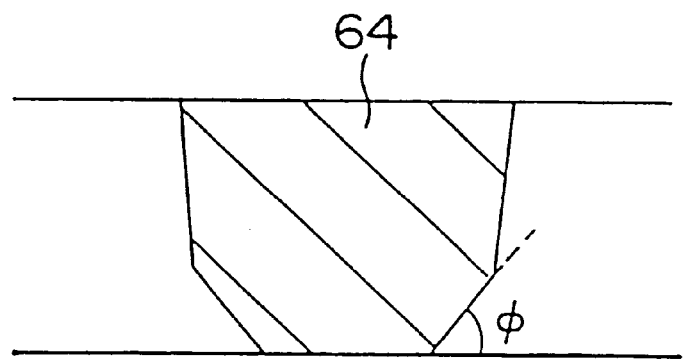
FIG. 21 is a diagram to aid in the explanation of the effect of curbing the occurrence of gross porosity in the completely embedded magnetic material layer shown in FIG. 19.
Figure 22:
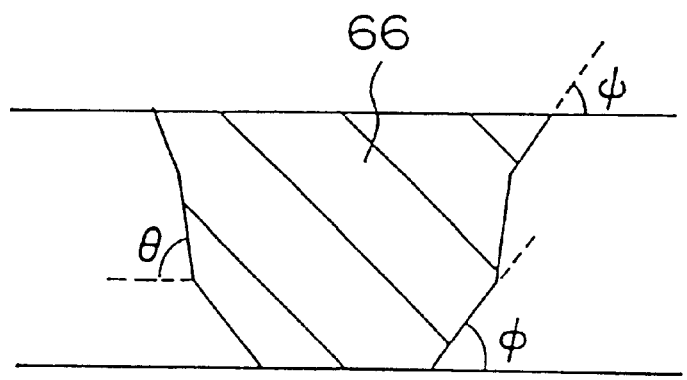
FIG. 22 is a diagram to aid in the explanation of the effect of curbing the occurrence of gross porosity in another completely embedded magnetic material layer.

In the magnetic material layer 64 furnished with such a two-step tapered cross section as described above, the effect of preventing the occurrence of gross porosity can be brought about in the process of production shown in FIG. 18, for example, by confining the upper tapering angle $\phi$ within the range, 0 degree<$\phi$<80 degrees, as shown in FIG. 20. In the process of production shown in FIG. 19, the effect of preventing the occurrence of gross porosity can be brought about by confining the lower taping angle $\phi$ within the range, 20 degrees<$\phi$<80 degrees, as shown in FIG. 21. Then, in a magnetic material layer 66 furnished with a three-step tapered cross section as shown in FIG. 22, the effect of preventing the occurrence of gross porosity is obtained by confining the lower tapering angle $\phi$ within the range, 20 degrees<$\phi$<88 degrees, and causing the intermediate tapering angle $\theta$ and the upper tapering angle $\psi$ to satisfy the relations, $\phi$<$\theta$ and $\psi$<$\theta$, respectively. The effect of preventing the occurrence of gross porosity is further higher when the relation, $\psi$<$\phi$, is satisfied.

Now, the seventh embodiment of this invention will be described below with reference to FIG. 23.

Figure 23:
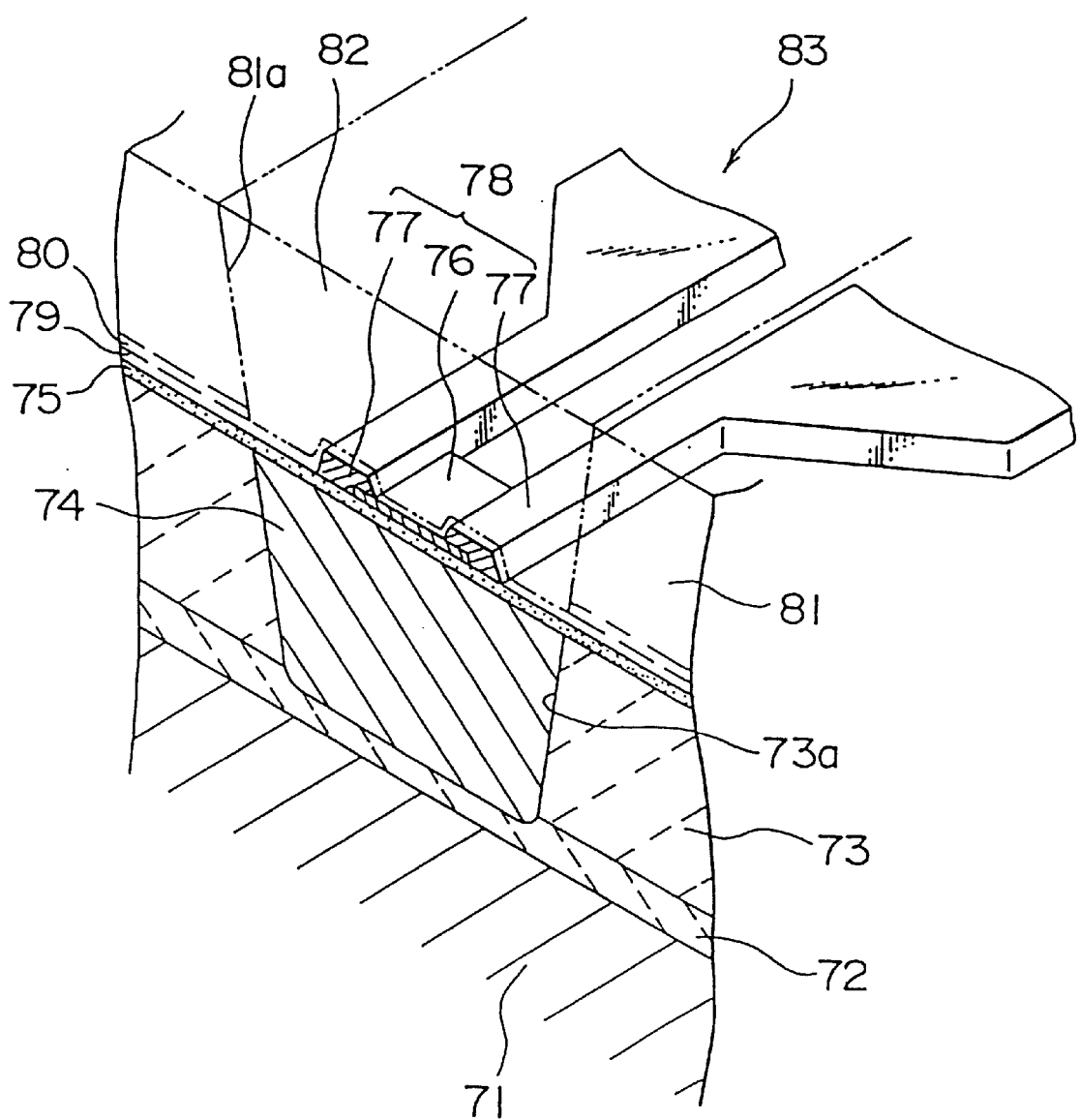
FIG. 23 is a perspective view showing partly in cross section the construction of a MR head according to the seventh embodiment of this invention.

FIG. 23 is a partially sectioned perspective view showing the construction of a magnetoresistance effect type head according to the embodiment of this invention. A trench-forming insulating layer 73 made as of SiO$_2$ is formed on an insulating layer made as of Al$_2$O$_3$ and formed on a substrate 71. A lower shield layer 74 made of such a soft magnetic material as NiFe alloy or Co-based amorphous alloy is formed as embedded in a trench 73a which is formed in the insulating layer 73.

A magnetoresistance effect film 76 such as, for example, an anisotropic magnetoresistance effect film made as of Ni$_{80}$Fe$_{20}$, a spin valve film formed as of a Co$_{90}$Fe$_{10}$/Cu/Co$_{90}$Fe$_{10}$ laminate film, or a artificial lattice film is formed through the medium of a lower regenerating magnetic gap layer 75 formed of an insulating film as of Al$_2$O$_3$ on the lower shield layer 74. This magnetoresistance effect film 76 is patterned in a prescribed shape and has a pair of leads 77 as of Cu connected each to the opposite ends thereof. These components jointly form a MR element 78.

An upper regenerating magnetic gap layer 79 formed of an insulating film as of Al$_2$O$_3$ is formed on the MR element 78 and a trench-forming insulating layer 81 made as of SiO$_2$ is formed further thereon through the medium of an etching stopper layer 80 made as of C. An upper shield layer 82 is formed as embedded in a trench 81a which is formed in the insulating layer 81. As a result, a shield type MR head 83 which is destined to function as a regenerating head is formed.

Figure 24:
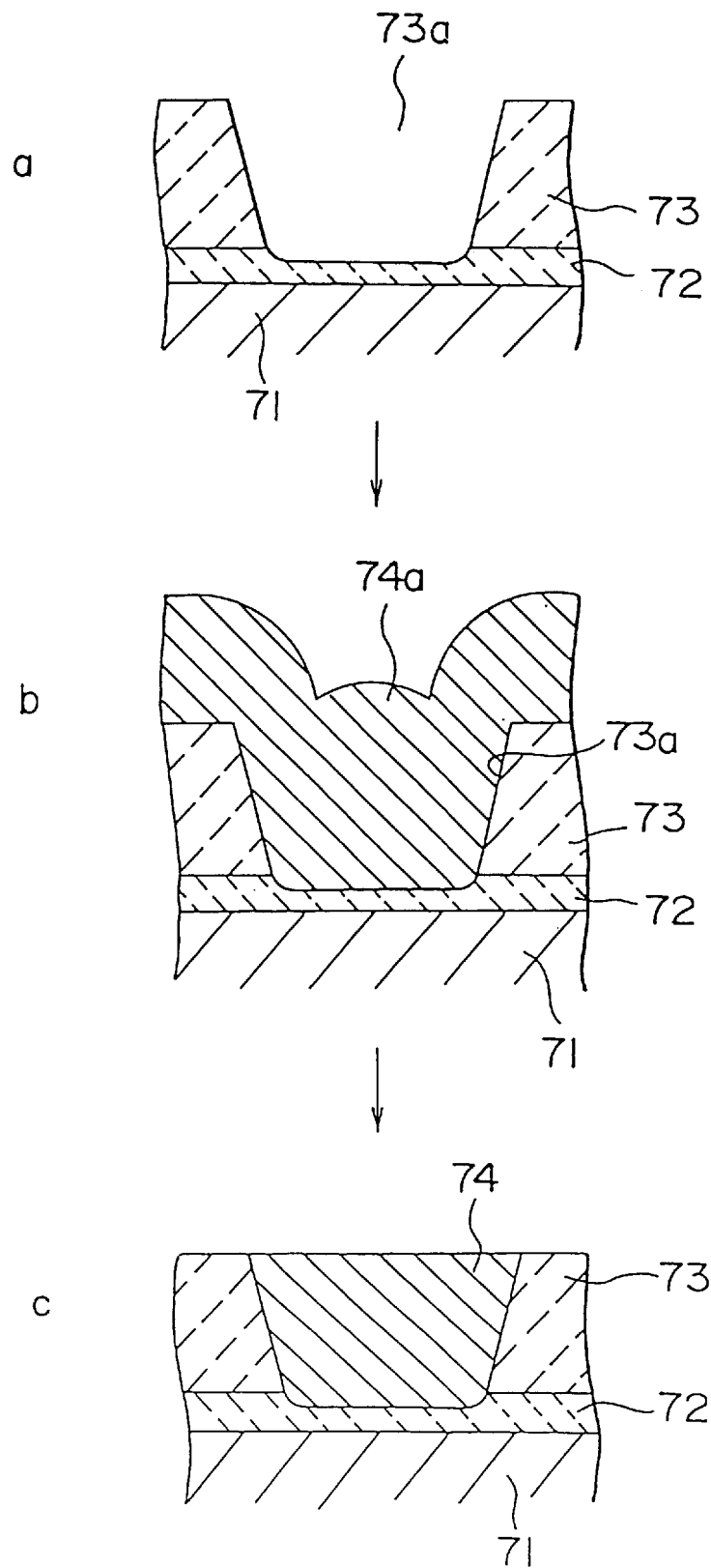
FIGS. 24a, b and c are a cross section showing part of a process for the production of the MR head shown in FIG. 23.
Figure 25:
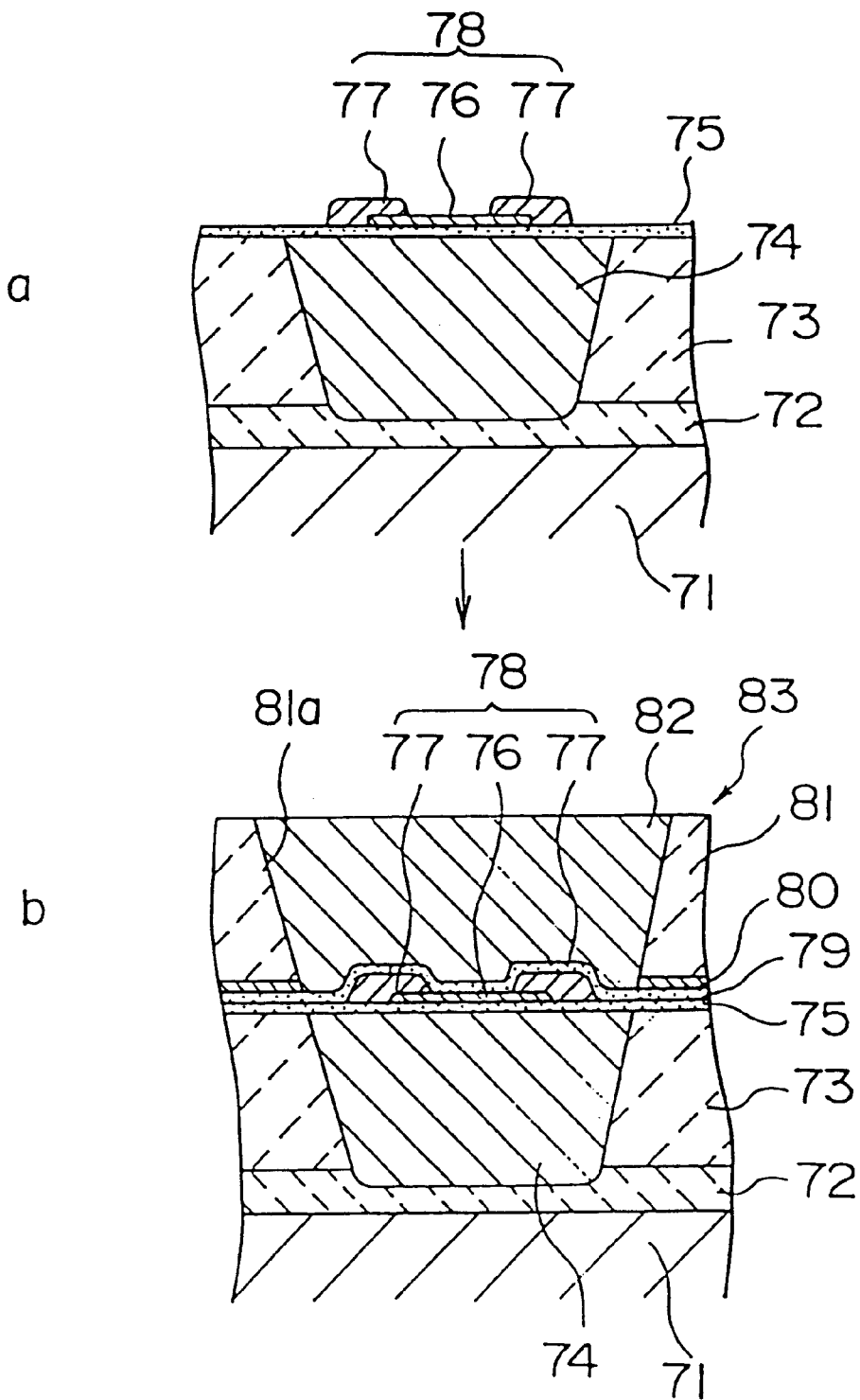
FIGS. 25a and b are a cross section showing the part of the process for the production of the MR head shown in FIG. 23, subsequent to the part of the process shown in FIG. 24.

Now, the process for the production of the MR head which is constructed as described above will be described below with reference to FIGS. 24a, b and c and FIGS. 25a and b.

First, the insulating layer 72 having a thickness of about 10 μm and made as of Al$_2$O$_3$ and the trench-forming insulating layer 73 having a thickness of about 2 μm and made as of SiO are formed in the order mentioned on the substrate 71. Then, a resist mask (not shown) is formed on the trench-forming insulating layer 73 and then the insulating layer 73 is etched with the etching gas as of $CF_4$ to form the trench 73a which corresponds to a part for the formation of the lower shield layer 74 as shown in a in FIG. 24. By suitably selecting the etching conditions in this case, the lateral walls of the trench 73a may be slightly tapered or extended perpendicularly.

Then, an amorphous soft magnetic alloy 74a destined to form the lower shield layer 74 is filled in the trench 73a mentioned above (b in FIG. 24) and the unnecessary part of the filled soft magnetic alloy is removed by the polishing technique to give rise to the lower shield layer 74 (c in FIG. 24). In this case, the magnetic characteristic of the embedding type lower shield layer 74 in the edge part thereof can be easily controlled when a taper has been imparted to the lateral walls of the trench 73a during the preceding etching step. The embedment of the magnetic material mentioned above is particularly desired to be carried out by the collimation spattering technique.

Then, the lower regenerating magnetic gap layer 75 having a thickness of about 0.1 μm and formed of an insulating film as of $Al_2O_3$ and the magnetoresistance effect film 76 formed of an anisotropic magnetoresistance effect film or a spin valve film are formed in the order mentioned on the lower shield layer 74. This magnetoresistance effect film 76 is patterned in a prescribed shape and the pair of leads 77 made as of Cu are formed at the opposite ends of the patterned magnetoresistance effect film 76 as by the lift-off technique to give rise to the MR element 78 (a in FIG. 25).

Then, the MR element 87 is covered with the upper regenerating magnetic gap layer 79 having a thickness of about 0.1 μm and formed of an insulating film as of $Al_2O_3$, the etching stopper layer 80 having a thickness of about 0.05 μm and made as of C is formed, and further the trench-forming insulating layer 81 having a thickness of about 2 μm and made as of $SiO_2$ are formed. A trench 81a is formed by etching the trench-forming insulating layer 81 in the same manner as in the process for the formation of the lower shield layer 74. Further, the etching stopper layer 80 at the bottom of the trench 81a is removed by the CDE treatment using $O_2$ or the RIE treatment. Thereafter, the upper shield layer 82 is formed by filling an amorphous soft magnetic alloy in the trench 81a in the same manner as in the process for the formation of the lower shield layer 74 and removing the unnecessary part of the filled alloy as by the polishing treatment (b in FIG. 25). The shield type MR head 83 of the present example is obtained as described above.

In the shield type MR head 83 constructed as described above, the upper surface of this MR head 83 including the upper surface of the insulating layer 73 can be finished with a substantially flat and smooth face because the lower shield layer 74 is formed by filling the soft magnetic material in the trench 73a formed in the insulating layer 73 and then removing the unnecessary part of the filled soft magnetic material. Then, since the MR element 78 is formed through the medium of the lower regenerating magnetic gap layer 75 on the flat smooth surface mentioned above, the difference of level in the pattern can be confined within 0.1 μm even when the width of the lower shield layer 74 is about 2 μm and the track width or the width of the stripe (remnant) pattern of the magnetoresistance effect film 76 is about 1 μm.

Further, since the surface of the substrate of the MR element 78, namely the upper surface of the lower shield layer 74 including the upper surface of the insulating layer 73, can be flattened accurately within 3 nm by $R_{max}$, the specific resistance of the magnetoresistance effect film 86 having a thickness in the approximate range of from 10 to 30 nm and formed as of $Ni_{80}Fe_{20}$ can be confined within about 20 μΩcm and the ratio of change of resistance can be increased. For example, when the magnetoresistance effect film 76 made of $Ni_{80}Fe_{20}$ is used in the construction of the seventh embodiment described above, it shows a ratio of change of resistance increased to about 3.5% as compared with the conventional shield type MR head which shows a ratio of change of resistance of about 2%.

As described above, the shield type MR head of the present embodiment allows the track of decreased width to be formed accurately and easily even when the width of the shield layer is narrowed. Further, the regeneration output can be stabilized and the efficiency of regeneration enhanced because this shield type MR head is allowed to acquire an ideal ratio of change of resistance. This effect is manifested particularly conspicuously when the width of the shield layer is not more than 5 μm and the track width is not more than 4 μm.

Figure 26:
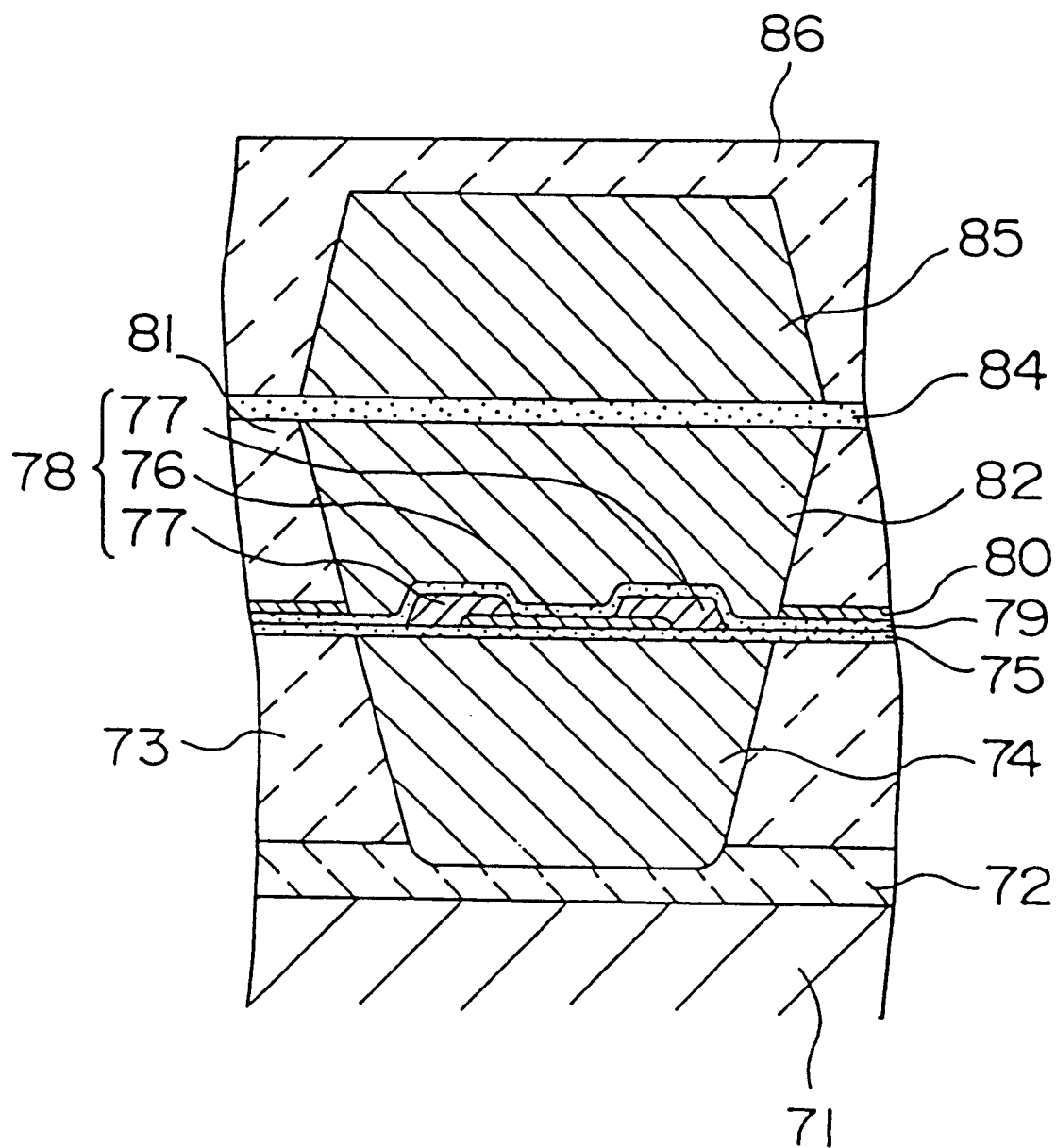
FIG. 26 is a cross section showing the construction of a separate recording-reproducing type magnetic head using the MR head shown in FIG. 23.
Figure 27:
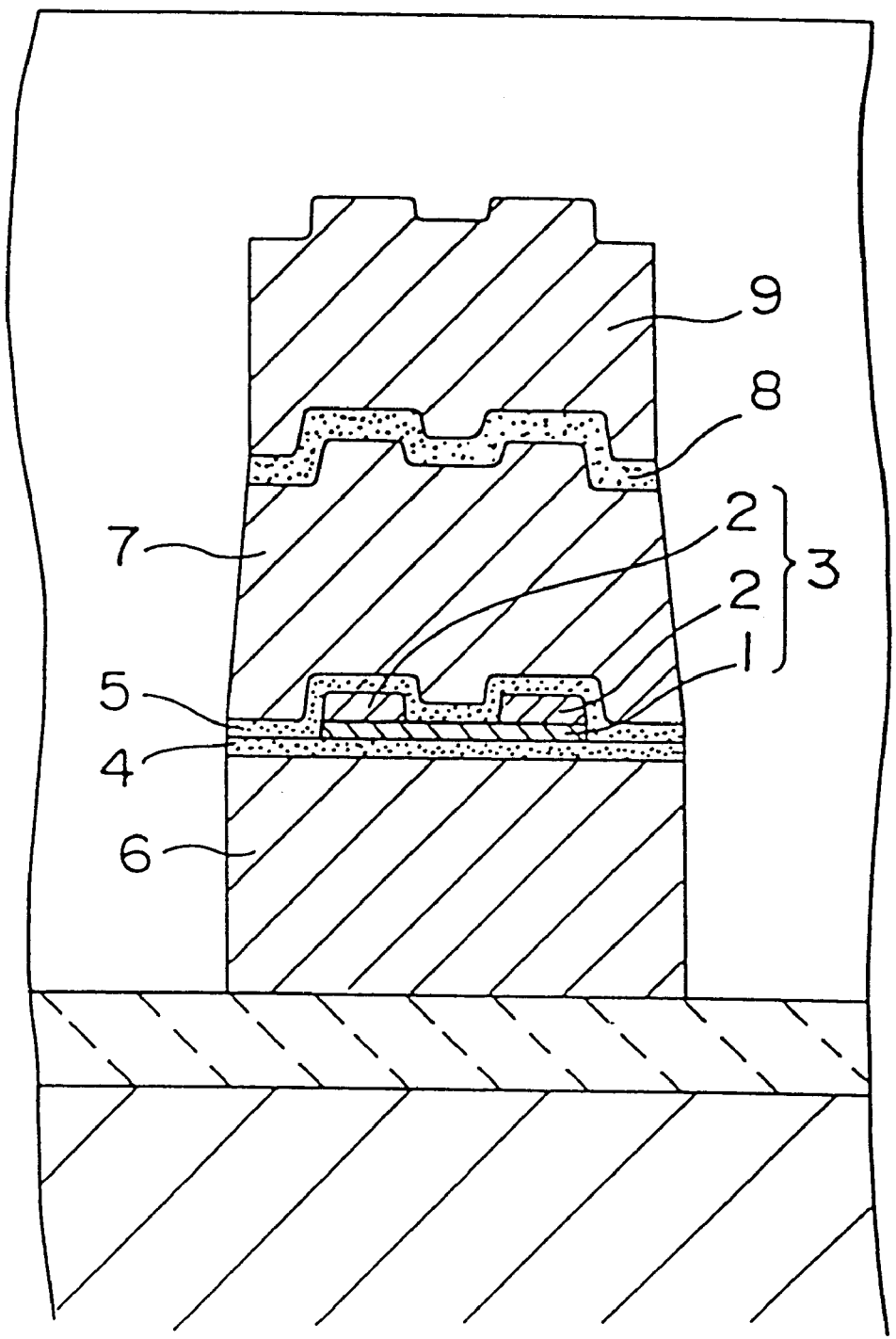
FIG. 27 is a cross section showing the construction of a conventional separate recording-reproducing type magnetic head.
Figure 28:
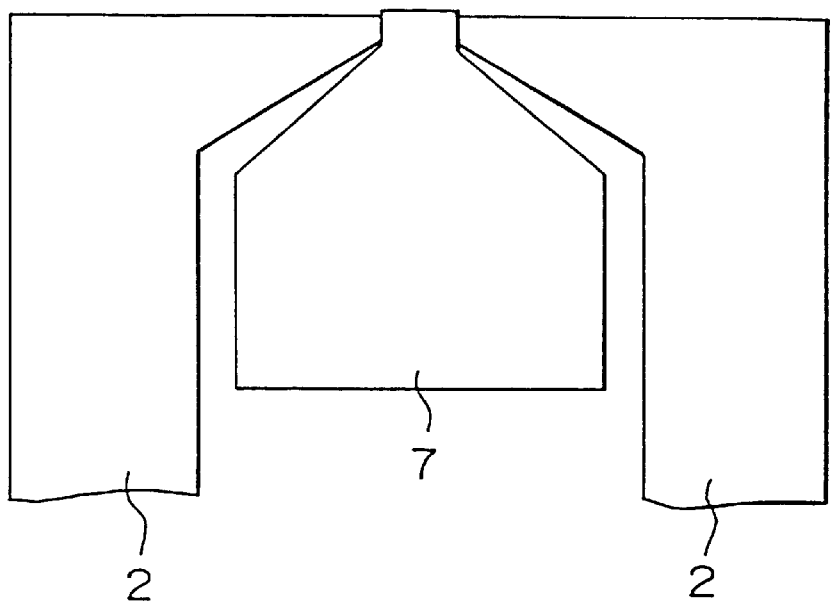
FIG. 28 is a diagram showing an example of the layout of leads in the conventional MR head.
Figure 29:
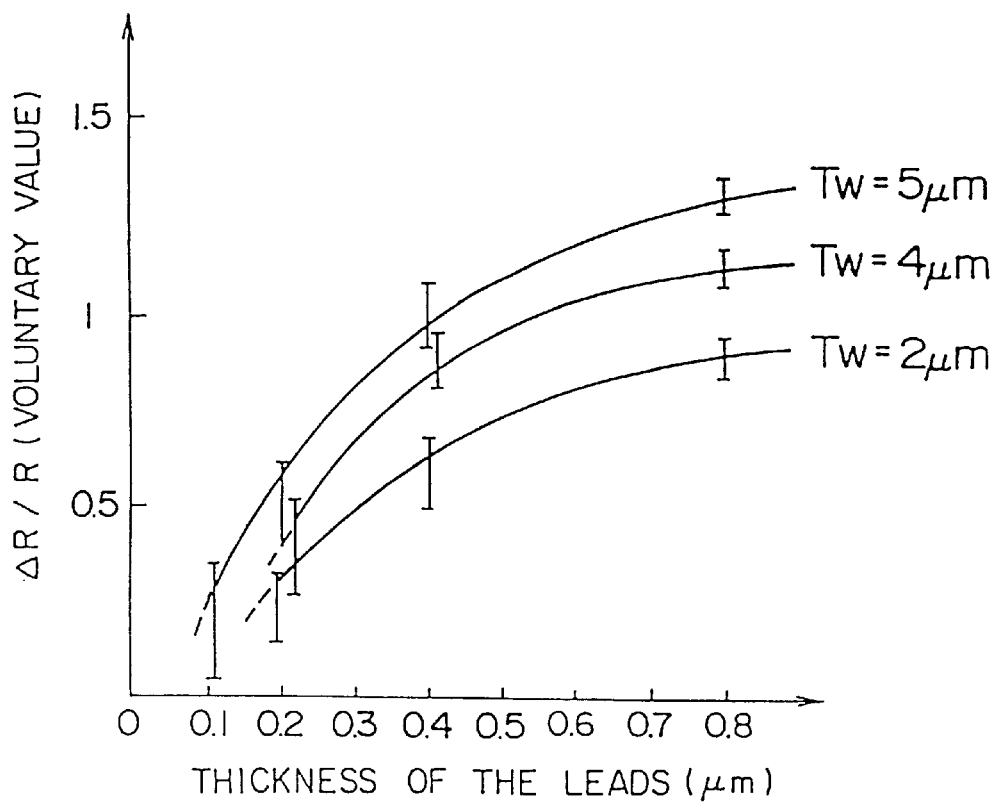
FIG. 29 is a characteristic diagram showing the relation between the thickness of the leads and the ratio of change of resistance of the MR element as determined in the layout of the leads shown in FIG. 28 with respect to varied track widths ($T_w$).

In order to produce a separate recording-reproducing magnetic head by forming a recording head formed of an induction type thin-film magnetic head on a regenerating head formed of such a shield type MR head as described above, an upper magnetic core 85 is formed by an ordinary method through the medium of a recording magnetic gap layer 84 made as of $Al_2O_3$ on the upper shield layer 82 concurrently serving as the lower magnetic core of the recording head. In the diagram, 86 stands for a projecting film made as of $Al_2O_3$. FIG. 26 omits such components as the recording coil.

The separate recording-reproducing magnetic head which is constructed as described above is enabled to acquire a substantially flattened upper surface, because the upper shield layer 82 concurrently serving as the lower magnetic core of the recording head is formed by filling the soft magnetic material in the trench 81a formed in the insulating layer 81, and then removing the unnecessary part of the filled material. Specifically, the recording magnetic gap 84 endowed with linearity of not more than 0.1 μm can be easily obtained.

The linearity of the recording magnetic gap layer 84 can be attained without relying on the thickness of the leads 77 of the MR head. This linearity can be substantially imparted to the recording magnetic gap layer 84 even when the leads 77 are given a thickness of not less than 0.2 μm, even not less than 0.4 μm, for the purpose of curbing the possible dispersion of the specific resistance of the leads 77 and enabling the MR element 78 to obtain an ideal ratio of change of resistance. As a result, the acquisition of ideal off-track characteristic during the regeneration with the MR head can be realized without a sacrifice of the ratio of change of resistance exhibited by the MR head. This effect manifests itself satisfactorily when the thickness of the leads 77 is not less than 1/10 times the thickness of the recording magnetic gap layer 84 (gap length) and particularly conspicuously when the thickness of the recording magnetic gap layer 83 is not more than 0.2 μm or when the track width is not more than 4 μm.

It is clearly remarked from the embodiments described above that the first magnetoresistance effect type head of this invention realizes the decrease of gap width and the decrease of track width without being affected by the thickness of the leads. As a result, the linear resolution suitable for a system of high recording density can be stably obtained. Further, by the first separate recording-reproducing type magnetic head of this invention, not only the adaptation for a system of high recording density but also the exaltation of recording-reproducing characteristic can be accomplished.

By the second magnetoresistance effect type head of this invention, the accurate regulation of such dimensions as the track width of the MR element and the acquisition of ideal ratio of change of resistance can be realized even when the decrease of track width is aimed at. Besides, the acquisition of ideal off-track characteristic can be realized in the second separate recording-reproducing type magnetic head of this invention.

What is claimed is:

1. A method for manufacturing a recording-reproducing magnetic head comprising the steps of:

depositing a lower shield layer on a substrate;

forming a lower magnetic gap-forming layer on the lower shield layer;

forming a magnetoresistance effect element having a magnetic responding part on the lower magnetic gap-forming layer;

forming an upper magnetic gap-forming layer over the magnetoresistance effect element;

forming a first insulating layer on the upper magnetic gap-forming layer;

forming a first trench in the first insulating layer to expose a flat surface region of the upper magnetic gap-forming layer;

forming an upper shield layer on the first insulating layer while filling a magnetic material of the upper shield layer into the first trench, thereby forming a first protruding part of the upper shield layer extending to the upper magnetic gap-forming layer;

forming a second protruding part on the upper shield layer by milling the upper shield layer, thereby forming the upper shield layer with a second protruding part protruding away from the first insulating layer;

forming a recording magnetic gap layer having a substantially uniform thickness on the upper shield layer with the second protruding part;

forming a second insulating layer on the recording magnetic gap layer;

forming a second trench in the second insulating layer at a position opposed to the second protruding part and separated therefrom by the recording magnetic gap layer; and forming an upper magnetic core having a third protruding part formed by filling a magnetic material of the upper magnetic core in the second trench so that the lower magnetic core is opposed to the upper magnetic core with the recording magnetic gap layer therebetween, the third protruding part contacting the recording magnetic gap layer at a flat surface thereof.

2. The method of claim 1, wherein the step of forming the upper magnetic core includes forming the third protruding part with a tapered cross section such that the width of cross section of the third protruding part decreases toward the recording magnetic gap layer.

3. The method of claim 2, wherein the step of forming the second protruding part of the upper shield layer forms the second protruding part with a cross section such that the width of cross section of the second protruding part decreases toward the recording magnetic gap layer.

4. The method of claim 1, wherein the third protruding part is formed with a two-step tapered cross section comprising an upper taper and a lower taper, the upper taper has an angle of not more than 80 degrees with a plane parallel to the flat surface of the recording magnetic gap layer.

* * * * *